United States Patent
Baek et al.

(10) Patent No.: US 11,304,170 B2
(45) Date of Patent: Apr. 12, 2022

(54) APPARATUS AND METHOD FOR REGISTRATION ON NETWORK IN WIRELESS COMMUNICATION SYSTEM

(71) Applicant: Samsung Electronics Co., Ltd., Gyeonggi-do (KR)

(72) Inventors: Youngkyo Baek, Gyeonggi-do (KR); Sangjun Moon, Gyeonggi-do (KR); Jungshin Park, Gyeonggi-do (KR); Jicheol Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/267,667

(22) PCT Filed: Aug. 13, 2019

(86) PCT No.: PCT/KR2019/010265
§ 371 (c)(1),
(2) Date: Feb. 10, 2021

(87) PCT Pub. No.: WO2020/036401
PCT Pub. Date: Feb. 20, 2020

(65) Prior Publication Data
US 2021/0329583 A1    Oct. 21, 2021

(30) Foreign Application Priority Data

Aug. 13, 2018  (KR) .......... 10-2018-0094572
Sep. 21, 2019  (KR) .......... 10-2018-0113871

(51) Int. Cl.
*H04W 60/00*   (2009.01)
*H04W 8/18*    (2009.01)
(Continued)

(52) U.S. Cl.
CPC .......... *H04W 60/00* (2013.01); *H04W 8/186* (2013.01); *H04W 12/06* (2013.01); *H04W 48/02* (2013.01); *H04W 48/08* (2013.01)

(58) Field of Classification Search
CPC ..... H04W 60/00; H04W 8/186; H04W 12/06; H04W 48/02; H04W 48/08; H04W 8/18; H04W 48/18; H04W 8/20; H04L 63/0892
See application file for complete search history.

(56) References Cited

U.S. PATENT DOCUMENTS

| 10,420,016 B2* | 9/2019 | Ryu ................. H04W 4/16 |
| 2005/0177647 A1* | 8/2005 | Anantha .......... H04L 29/12396 709/249 |

(Continued)

FOREIGN PATENT DOCUMENTS

| KR | 101669165 | 10/2016 |
| KR | 1020170004835 | 1/2017 |
| KR | 1020170119296 | 10/2017 |

OTHER PUBLICATIONS

PCT/ISA/210 Search Report issued on PCT/KR2019/010265, dated Dec. 13, 2019, pp. 5.

(Continued)

*Primary Examiner* — Brandon J Miller
(74) *Attorney, Agent, or Firm* — The Farrell Law Firm, P.C.

(57) ABSTRACT

The present disclosure relates to a pre-5th-Generation (5G) or 5G communication system to be provided for supporting higher data rates beyond 4th-Generation (4G) communication system such as long-term evolution (LTE). According to various embodiments of the present disclosure, an operating method of a core network entity in a wireless communication system, may include obtaining identification information of a private network from a registration request message obtained from a user equipment, selecting an authentication (Continued)

server function (AUSF) which supports authentication for the UE, based on the identification information of the private network, in response to performing an authentication procedure for the AUSF and the UE, selecting unified data management (UDM) for managing subscription information and registration information of the UE, obtaining the subscription information of the UE for the private network from the UDM, performing validity check of the UE for the private network, based on the subscription information of the UE, and registering the UE at the private network, based on results of the authentication procedure and the validity check.

16 Claims, 13 Drawing Sheets

(51) Int. Cl.
*H04W 12/06* (2021.01)
*H04W 48/02* (2009.01)
*H04W 48/08* (2009.01)

(56) References Cited

U.S. PATENT DOCUMENTS

| 2013/0046976 A1* | 2/2013 | Rosati | H04W 12/03 |
| | | | 713/168 |
| 2013/0318572 A1 | 11/2013 | Singh et al. | |
| 2019/0098618 A1 | 3/2019 | Lee et al. | |

OTHER PUBLICATIONS

PCT/ISA/237 Written Opinion issued on PCT/KR2019/010265, dated Dec. 13, 2019, pp. 5.

ETSI TS 123 501 V15.2.0 (Jun. 2018), Technical Specification 5G; System Architecture for the 5G System (3GPP TS 23.501 version 15.2.0 Release 15), pp. 220.

ETSI TS 123 502 V15.2.0 (Jun. 2018), Technical Specification, 5G; Procedures for the 5G System (3GPP TS 23.502 version 15.2.0 Release 15), pp. 312.

* cited by examiner

APPARATUS AND METHOD FOR REGISTRATION ON NETWORK IN WIRELESS COMMUNICATION SYSTEM

PRIORITY

This application is a National Phase Entry of International Application No. PCT/KR2019/010265, which was filed on Aug. 13, 2019, and claims priority to Korean Patent Application Nos. 10-2018-0094572 and 10-2018-0113871, filed in the Korean Intellectual Property Office on Aug. 13, 2018 and Sep. 21, 2018, respectively, the entire content of each of which is incorporated herein by reference.

TECHNICAL FIELD

The present disclosure relates generally to a wireless communication system and, more particularly, to an apparatus and a method for registering for a network in the wireless communication system.

BACKGROUND ART

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system, a terminal may receive a service from various networks. To receive the service, the terminal is required to register at the network.

DISCLOSURE OF INVENTION

Technical Problem

Based on the discussions described above, the present disclosure provides an apparatus and a method for registering at a network in a wireless communication system.

Also, the present disclosure provides an apparatus and a method for a terminal to access a private network if the terminal discovers the private network and selects the discovered private network.

Also, the present disclosure provides an apparatus and a method for accessing a private network based on a type of the private network and/or a relationship between the private network and a public network to which a terminal is subscribed, if the terminal intending to use the private network discovers the private network.

Solution to Problem

According to various embodiments of the present disclosure, an operating method of a core network entity in a wireless communication system, may include obtaining identification information of a private network from a registration request message obtained from a user equipment, selecting an authentication server function (AUSF) which supports authentication for the UE, based on the identification information of the private network, in response to performing an authentication procedure for the AUSF and the UE, selecting unified data management (UDM) for managing subscription information and registration information of the UE, obtaining the subscription information of the UE for the private network from the UDM, performing validity check of the UE for the private network, based on the subscription information of the UE, and registering the UE at the private network, based on results of the authentication procedure and the validity check.

According to various embodiments of the present disclosure, an apparatus of a core network entity in a wireless communication system, may include a transceiver, and at least one processor functionally coupled with the transceiver, and controlling the transceiver, wherein the at least one processor is configured to obtain identification information of a private network from a registration request message obtained from a user equipment, select an AUSF which supports authentication for the UE, based on the identification information of the private network, in response to performing an authentication procedure for the AUSF and the UE, select UDM for managing subscription information and registration information of the UE, obtain subscription information of the UE for the private network from the UDM, perform validity check of the UE with respect to the private network, based on the subscription information of the UE, and register the UE to the private network, based on results of the authentication procedure and the validity check.

Advantageous Effects of Invention

An apparatus and a method according to various embodiments of the present disclosure, may enable a terminal to effectively access a private network.

Effects obtainable from the present disclosure are not limited to the above-mentioned effects, and other effects which are not mentioned may be clearly understood by those skilled in the art of the present disclosure through the following descriptions.

BEST MODE FOR CARRYING OUT THE INVENTION

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for registering at a network in a wireless communication system. Specifically, the present disclosure provides a technique for a terminal to register at a private network in the wireless communication system.

Terms indicating signals, terms indicating channels, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standard (e.g., 3rd generation partnership project (3GPP)), which are merely exemplary for explanations. Various embodiments of the present disclosure may be easily modified and applied also in other communication systems.

Figure 1:
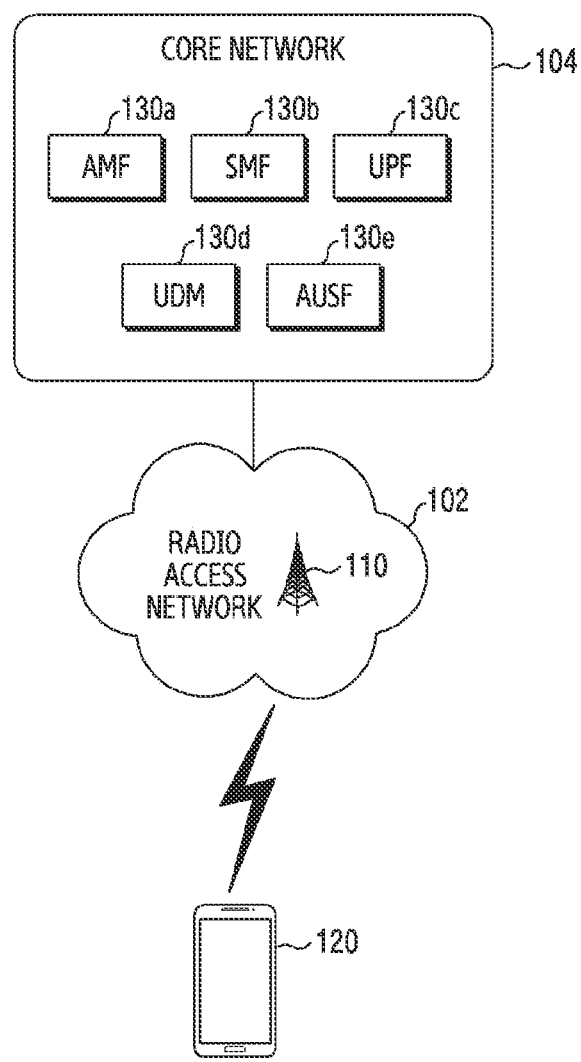
FIG. 1 illustrates a wireless communication system according to various embodiments of the present disclosure.

FIG. 1 illustrates a wireless communication system according to various embodiments of the present disclosure.

Referring to FIG. 1, the wireless communication system includes a radio access network (RAN) 102 and a core network (CN) 104.

The RAN 102 is a network directly connected to a user device, for example, a terminal 120, and is an infrastructure for providing radio access to the terminal 120. The RAN 102 includes a set of base stations including a base station 110, and the base stations may perform communication through interfaces formed between them. At least some of the interfaces between the base stations may be wired or wireless. The base station 110 may be divided into a central unit (CU) and a distributed unit (DU) in structure. In this case, one CU may control a plurality of DUs. The base station 110 may be referred to as, besides the base station, an 'access point (AP)', a 'next generation node B (gNB)', a '5th generation node (5G node)', a 'wireless point', a 'transmission/reception point (TRP)', or other term having a technically equivalent meaning. The terminal 120 may access the RAN 102, and communicates with the base station 110 over a radio channel. The terminal 120 may be referred to as, besides the terminal, a 'user equipment (UE)', a 'mobile station', a 'subscriber station', a 'remote terminal', a 'wireless terminal', or a 'user device', or other term having a technically equivalent meaning.

The CN 104, which a network for managing the whole system, control the RAN 102, and processes data and control signals for the terminal 120 which are transmitted and received over the RAN 102. The CN 104 performs various functions such as control of a user plane and a control plane, mobility processing, subscriber information management, charging, interworking with other type of the system (e.g., a long term evolution (LTE) system). To execute such various functions, the CN 104 may include a plurality of entities which are functionally separated with different network functions (NFs). For example, the CN 104 may include access and mobility management function (AMF) 130a, session management function (SMF) 130b, user plane function (UPF) 130c, unified data repository (UDR) 130d, and authentication server function (AUSF) 130e.

The AMF 130a may terminate non access stratum (NAS) signaling, and perform NAS ciphering, and/or integrity protection, registration management, connection management, mobility management, access authentication, and security context management. For example, the AMF 130a may perform all or part of functions of a mobility management entity (MME) in an evolved packet core (EPC).

The SMF 130b may perform session management (e.g., session establishment, change, release), internet protocol (IP) address allocation and management for the terminal 120, termination of the NAS signaling related to the session management, downlink data notification, and traffic steering for the UPF 130c for proper traffic routing.

The UPF 130c may perform packet routing and forwarding, packet inspection, and quality of service (QoS) management. The UPF 130c may operate as an external protocol data unit (PDU) session point for interconnection with a data network. In addition, the UPF 130c may operate as an anchor point for moving between different radio access technologies (RATs) or moving in the same RAT. The UPF 130c may perform all or part of functions of a serving gateway (S-GW) and/or a packet data network gateway (P-GW) in the EPC.

The UDM 130d may generate an authentication and key agreement credential, process user identification information, and perform access authentication and subscription management. The UDM 130d may perform all or part of functions of a home subscriber server (HSS) in the EPC The AUSF 130e may operate as an authentication server. For example, the AUSF 130e may perform all or part of functions of a home subscriber server (HSS) in the EPC.

The entities of the CN 104 in FIG. 1 are exemplary, and the CN 104 may further include other entities. For example, the CN 104 may further include at least one of entities such as policy control function (PCF), network slice selection function (NSSF), network exposure function (NEF), NF repository function (NRF), and application function (AF).

Each of the entities of the CN 104 in FIG. 1 may be an independent hardware device, but may be a logical area or a hardware area of a general-purpose server device which performs functions of each node by using virtualized resources. For example, at least two functions of the entities in FIG. 1 may be carried out by the same server device.

In various embodiments, a cellular network including at least one of the CN 104 and/or the RAN 102 may be defined. In other words, the cellular network may include at least one of the core network 104 and/or the radio access network 102.

In various embodiments, the cellular network may be a private cellular network or a public cellular network. The private cellular network is a network constructed by a specific institution (e.g., a company, a school), and may be a network allowing its access to limited users. The public cellular network is a network constructed by a communication operator, and may be a network allowing its access to any subscribed users. In various embodiments, the private cellular network may be referred to as a private network, and the public cellular network may be referred to as a public network.

According to various embodiments, the private network may be divided into a private network of a type A and a private network of a type B according to the type of the private network. The private network of the type A may be a private network associated with the public network and operated by the operator of the public network. The private network of the type B may be a private network not associated with the public network and operated independently. In various embodiments, the private network of the type A may be referred to as a 'type A private network' or a 'private network type A', and the private network of the type B may be referred to as a 'type B private network' or a 'private network type B'.

Figure 2:
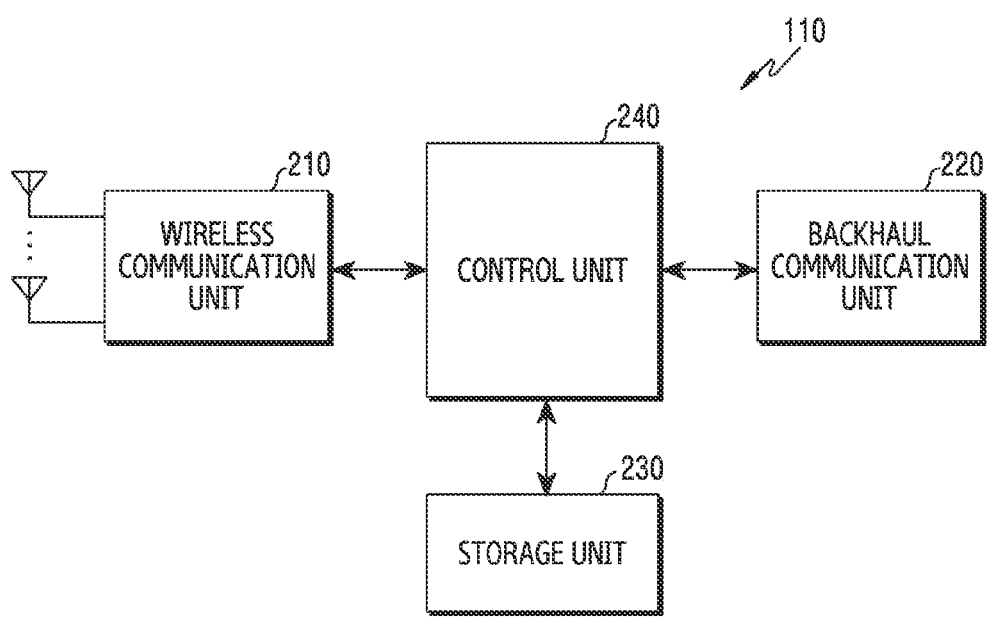
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration of FIG. 2 may be understood as the configuration of the base station 110. A term such as 'portion' or '~er' used hereafter indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 performs functions for transmitting and receiving signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and the like. In addition, the wireless communication unit 210 may include a plurality of transmit and receive paths. Further, the wireless communication unit 210 may include at least one antenna array including a plurality of antenna elements.

In view of hardware, the wireless communication unit 210 may include a digital unit and an analog unit, and the analog unit may include a plurality of sub-units according to an operating power and an operating frequency. The digital unit may be implemented with at least one processor (e.g., a digital signal processor (DSP)).

As such, the wireless communication unit 210 transmits and receives the signals. Hence, whole or part of the wireless communication unit 210 may be referred to as a 'transmitter', a 'receiver', or a 'transceiver'. Also, in the following, the transmission and the reception over the radio channel are used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station to other node, for example, to other access node, other base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. According to other embodiment, the protocol stack may be included in the wireless communication unit 210. For doing so, the control unit 240 may include at least one processor. According to various embodiments, the control unit 240 may control the base station to fulfill operations to be explained according to various embodiments.

Figure 3:
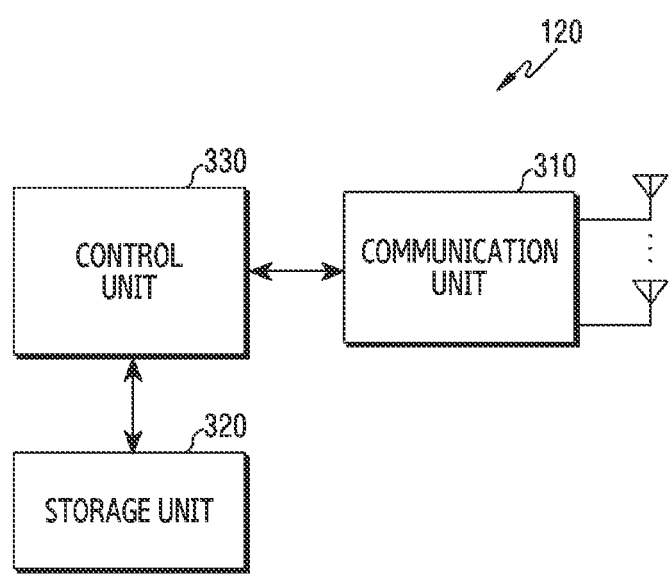
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration of FIG. 3 may be understood as the configuration of the terminal 120. A term such as 'portion' or '~er' indicates a unit for processing at least one function or operation, and may be implemented using hardware, software, or a combination of hardware and software.

Referring to FIG. 3, the terminal includes a communication unit 310, a storage unit 320, and a control unit 330.

The communication unit 310 performs functions for transmitting and receiving signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming.

As such, the communication unit 310 transmits and receives the signals. Hence, whole or part of the communication unit 310 may be referred to as a 'transmitter', a 'receiver', or a 'transceiver'. Hereafter, the transmission and the reception over the radio channel is used as the meaning which embraces the above-stated processing of the communication unit 310.

The storage unit 320 stores a basic program for operating the terminal, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. Also, part of the communication unit 310 and the control unit 330 may be referred to as a communication processor (CP). According to various embodiments, the control unit 330 may control the terminal to carry out operations to be explained according to various embodiments.

Figure 4:
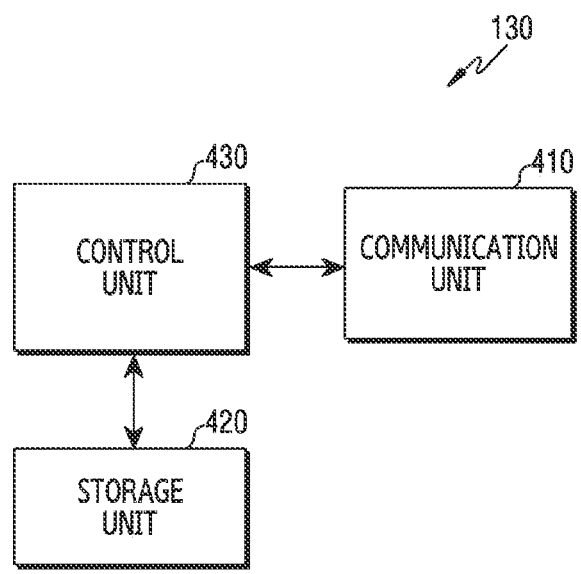
FIG. 4 illustrates a configuration of a core network entity in a wireless communication system according to various embodiments of the present disclosure.

FIG. 4 illustrates a configuration of a core network entity in a wireless communication system according to various embodiments of the present disclosure. A configuration 130 in FIG. 4 may be understood as the configuration of the device having at least one function of the AMF 130a, the SMF 130b, the UPF 130c, the UDM 130d and the AUSF 130e of FIG. 1. A term such as 'portion' or '~er' indicates a unit for processing at least one function or operation, and may be implemented using hardware, software, or a combination of hardware and software.

Referring to FIG. 4, the core network entity includes a communication unit 410, a storage unit 420, and a control unit 430.

The communication unit 410 provides an interface for communicating with other devices in the network. That is, the communication unit 410 converts a bit sting transmitted from the core network entity to other device, and converts a physical signal received from the other device to a bit string. That is, the communication unit 410 may transmit and receive signals. Hence, the communication unit 410 may be referred to as a modem, a transmitter, a receiver or a transceiver. In so doing, the communication unit 410 enables the core network entity to communicate with other devices or system via a backhaul connection (e.g., wired backhaul or wireless backhaul) or the network.

The storage unit 420 stores a basic program for operating the core network entity, an application program, and data such as setting information. The storage unit 420 may include a volatile memory, a non-volatile memory, or a combination of a volatile memory and a non-volatile memory. The storage unit 420 provides the stored data at a request of the control unit 430.

The control unit 430 controls general operations of the core network entity. For example, the control unit 430 transmits and receives signals through the communication unit 410. Also, the control unit 430 records and reads data in and from the storage unit 420. For doing so, the control unit 430 may include at least one processor.

According to various embodiments, the control unit 430 may obtain identification information of a private network from a registration request message obtained from the UE, and select an AUSF supporting UE authentication, based on the identification information of the private network, and the core network entity may control to select a UDM managing the subscription information and registration information of the UE, in response to performing the authentication procedure on the AUSF and the UE, obtain the subscription information of the UE for the private network from the UDM, perform validity check of the UE for the private network, based on the subscription information of the UE, and register the UE at the private network, based on results of the authentication procedure and the validity check. For example, the control unit 430 may control the core network entity to perform operations according to various embodiments to be described below.

Figure 5A:
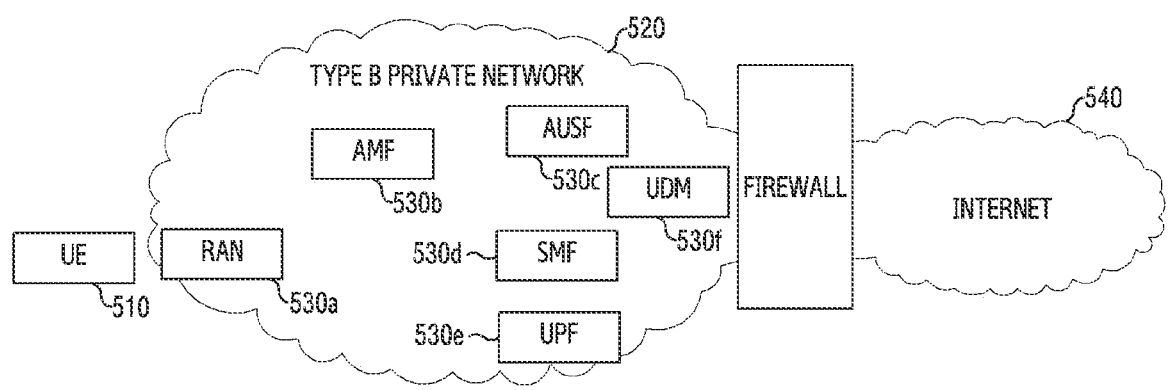
FIG. 5A illustrates a structure of a type B private network in a wireless communication system according to various embodiments of the present disclosure.

FIG. 5A illustrates a structure of a type B private network in a wireless communication system according to various embodiments of the present disclosure.

Referring to FIG. 5A, a structure of a type B private network 520 may be similar to the structure of the public network. In other words, a UE 510 accesses a CN of the type B private network 520 via a RAN 530a, and the CN of the type B private network 520 may include an AMF 530b which performs functions for mobility management and registration management of the UE 510, an AUSF 530c which performs a function for authentication of the UE 510, a UDM 530f which manages subscription of the UE 510, an SMF 530d which performs a function for session management, and a UPF 530e which performs a function for forwarding user data. However, the scheme used for the identification of the UE 510 and/or the authentication of the UE 510 in the type B private network 520 may be different from the public network.

In various embodiments, the type B private network 520 may be connected to an Internet 540, and a firewall may be installed between the type B private network 520 and the Internet 540 to provide security from external access.

In various embodiments, the type B private network 520 may include the CN 104 and the RAN 102. In this case, the CN of the type B private network 520 may correspond to the CN 104, and the AMF 530b, the AUSF 530c, the SMF 530d, the UPF 530e, and the UDM 530f may correspond to the AMF 130a, the AUSF 130e, the SMF 130b, the UPF 130c, and the UDM 130d respectively. In addition, the RAN 530a may correspond to the RAN 102, and may include the base station 110.

Figure 5B:
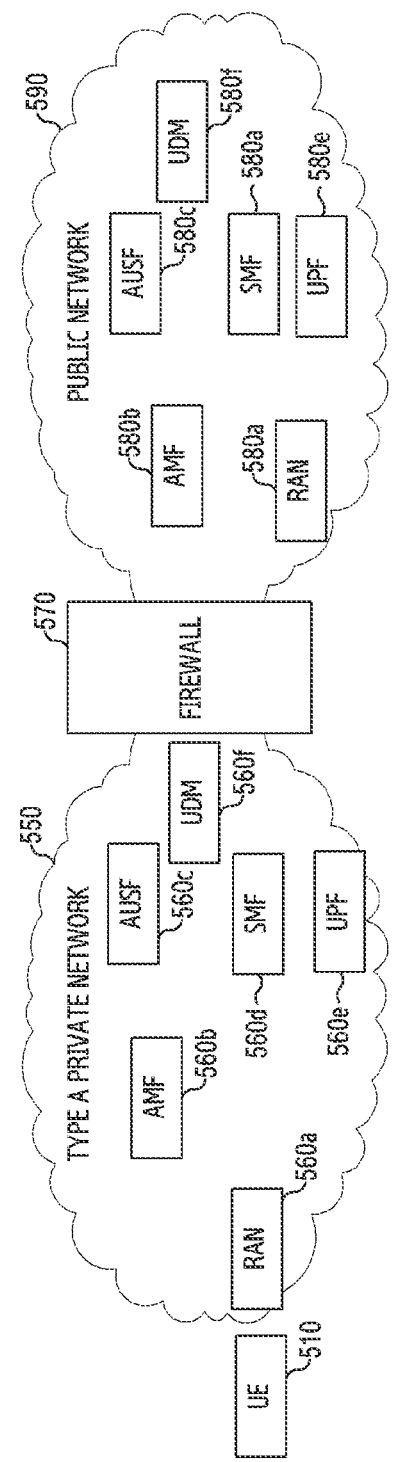
FIG. 5B illustrates a structure of a type A private network in the wireless communication system according to various embodiments of the present disclosure.

FIG. 5B illustrates a structure of a type A private network in the wireless communication system according to various embodiments of the present disclosure.

Referring to FIG. 5B, a type A private network 550 may be associated with a public network 590, and may be managed by the same operator as the operator of the public network 590. The UE 510 may access a CN of the type A private network through a RAN 560a, and the CN of the type A private network may include an AMF 560b which performs functions for mobility management and/or registration management of the UE, an AUSF 560c which performs a function for the authentication of the UE 510, a UDM 560f which manages information related to the subscription of the UE 510, an SMF 560d which performs a function for session management, and an UPF 560e which performs a function for forwarding user data.

Since the type A private network 550 may be associated with the public network 590, the association between the type A private network 550 and the public network 590 may be similar to a roaming network. Hence, if the UE 510 trying to access the type A private network 550 is subscribed to the public network 590, the scheme used for the identification of the UE 510 and/or the authentication of the UE 510 in the type A private network 550 may be the same as in the public network 590. As another example, even if the UE 510 trying to access the type A private network 550 is subscribed to the public network 590, the scheme used for the identification of the UE 510 and/or the authentication of the UE 510 in the type A private network 550 may be different from the public network 590.

By contrast, if the UE 510 trying to access the type A private network 550 is not subscribed to the public network 590, the scheme used for the identification of the UE 510 and/or the authentication of the UE 510 in the type A private network 550 may be different from the public network 590 as in the case of the type B private network 520.

In various embodiments, the type B private network 520 may include the CN 104 and the RAN 102. In this case, the CN of the type B private network 520 may correspond to the CN 104, and the AMF 530b, the AUSF 530c, the SMF 530d, the UPF 530e, and the UDM 530f may correspond to the AMF 130a, the AUSF 130e, the SMF 130b, the UPF 130c, and the UDM 130d respectively. In addition, the RAN 530a may correspond to the RAN 102, and may include the base station 110.

If the UE uses a communication service over the public network, the UE may identify the cellular network using a mobile country code (MCC), a mobile network code (MCC), and/or a public land mobile network (PLMN) identifier (ID). For the UE to register for the type A private network, not only information of the public network associated with the type A private network, but also additional information such as a private network ID (e.g., a private network ID (PN ID) or a network ID (NID), the PN ID and the NID are used as the same meaning in the present disclosure) allocated by the operator are used for the network identification. For the UE to register for the type B private network, since the type B private network is operated separately from the public network, the aforementioned private network ID together with the MCC or the MNC dedicated to the private network, that is, the PLMN ID indicating the private network may be used for the network identification.

Accordingly, various embodiments of the present disclosure may, if the UE intending to use the private network discovers the private network, an apparatus and a method for accessing the private network based on the type of the private network and/or the relationship between the private network and the public network to which the terminal is subscribed.

Further, since a method of the UE for discovering and selecting the private network and a procedure for registering at the private network may vary according to the type of the private network, various embodiments of the present disclosure provide an apparatus and a method for the UE to access the private network, if the UE discovers the private network and selects the discovered private network.

Figure 6:
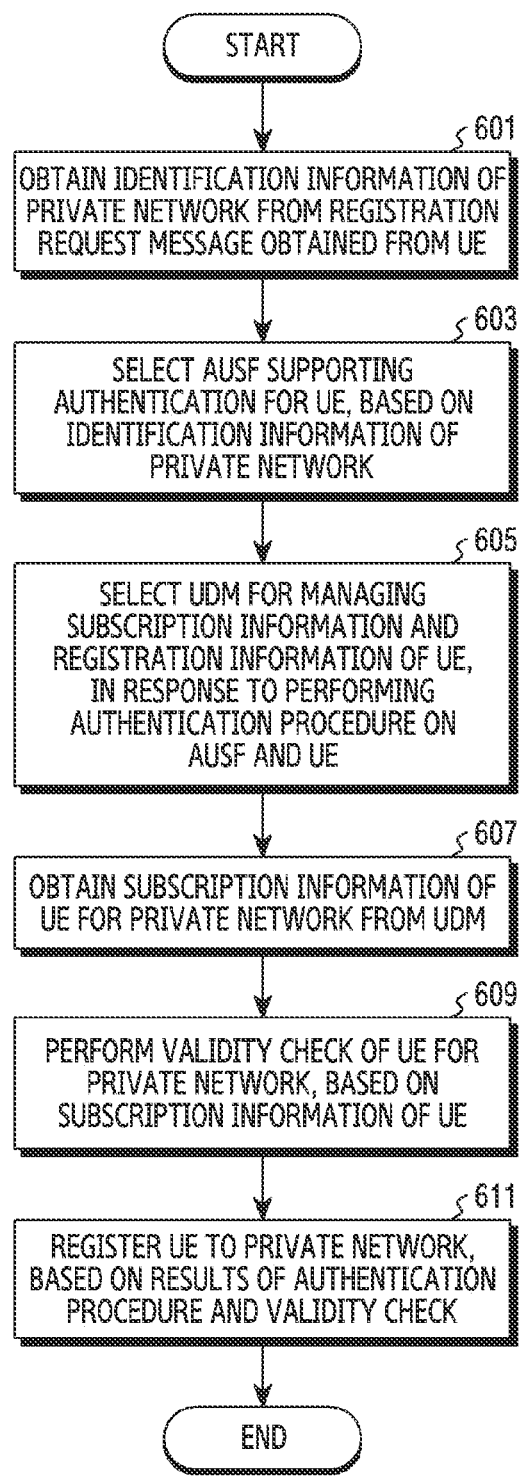
FIG. 6 illustrates a flowchart of a core network entity in a wireless communication system according to various embodiments of the present disclosure.

FIG. 6 illustrates a flowchart of a core network entity in a wireless communication system according to various embodiments of the present disclosure. FIG. 6 illustrates an operating method of the core network entity 130.

Referring to FIG. 6, in step 601, the core network entity obtains identification information of a private network from a registration request message obtained from a UE. The registration request message may further include not only the identification information of the private network, but also at least one of a registration type, an ID of the UE, a private network access indicator, and a private network UD ID. The identification information of the private network may be expressed by a combination of the MCC, the MNC, and the PN ID.

In step 603, the core network entity selects an AUSF supporting authentication for the UE, based on the identification information of the private network. In various embodiments, the AUSF of the public network may be selected, or the AUSF of the private network may be selected.

In step 605, the core network entity selects an UDM for managing subscription information and registration information of the UE, in response to performing the authentication procedure on the AUSF and the UE. Depending on whether the cellular network to which the AUSF belongs is the private network or the public network, the core network entity may select the UDM of the public network, or select the UDM of the private network.

In step 607, the core network entity obtains the subscription information of the UE for the private network from the UDM. The core network entity may update the registration information of the UE to the UDM through a UECM registration procedure, and retrieve the subscription information of the UE from the UDM through an SDM registration procedure.

In step 609, the core network entity performs validity check of the UE for the private network, based on the subscription information of the UE. In various embodiments, the validity check may include an authorization procedure for inspecting whether the UE is authorized to register at the private network.

In step 611, the core network entity registers the UE at the private network, based on results of the authentication procedure and the validity check. For example, if the authorization and the authentication are successful, the core network entity may forward to the UE a registration accept message including information indicating that the UE is successfully registered at the private network. Although not depicted, if the UE is successfully registered at the public network as well, the registration accept message may further include information indicating that the UE is successfully registered at the public network.

In various embodiments, the private network may include a type A private network associated with the public network.

If the private network includes the type A private network associated with the public network, the AUSF and the UDM may be included in the public network, and the core network entity may select a local UDM included in the private network, and obtain the subscription information of the UE for the private network from the local UDM. The core network entity may perform the validity check of the UE on the private network based on the subscription information of the UE obtained from the UDM, and the subscription information of the UE obtained from the local UDM.

If the private network includes the type A private network associated with the public network, the AUSF and the UDM may be included in the private network, and the core network entity may select a macro UDM included in the public network, obtain the subscription information of the UE for the private network from the macro UDM, and perform the validity check of the UE for the private network, based on the UE subscription information obtained from the UDM, and the UE subscription information obtained from the local UDM.

If the private network includes the type A private network associated with the public network, the registration request message may be transmitted within a preset time after the UE finishes its access to the public network. For example, the preset time may be a registration follow-on timer.

If the private network includes the type A private network associated with the public network, the core network entity may determine not to allow the UE registration for the public network based on at least one of the UE ID included in the registration request message and the identification information of the private network, and forward a registration reject message for the mobility registration of the UE to the UE, to trigger initial registration of the UE to the private network.

If the private network includes the type A private network associated with the public network, the core network entity may determine not to allow the UE registration for the public network, request the UE ID for the private network to the UE, and acquire the UE ID from the UE.

In various embodiments, the private network may include the type B private network not associated with the public network.

If the private network includes the type B private network not associated with the public network, the core network entity may identify the type B private network, based on the identification information of the private network included in the registration message, in response to identifying, determine not to allow the UE registration for the public network, and forward to the UE a registration reject message for the UE's mobility registration, to trigger the user's initial registration for the private network.

Figure 7:
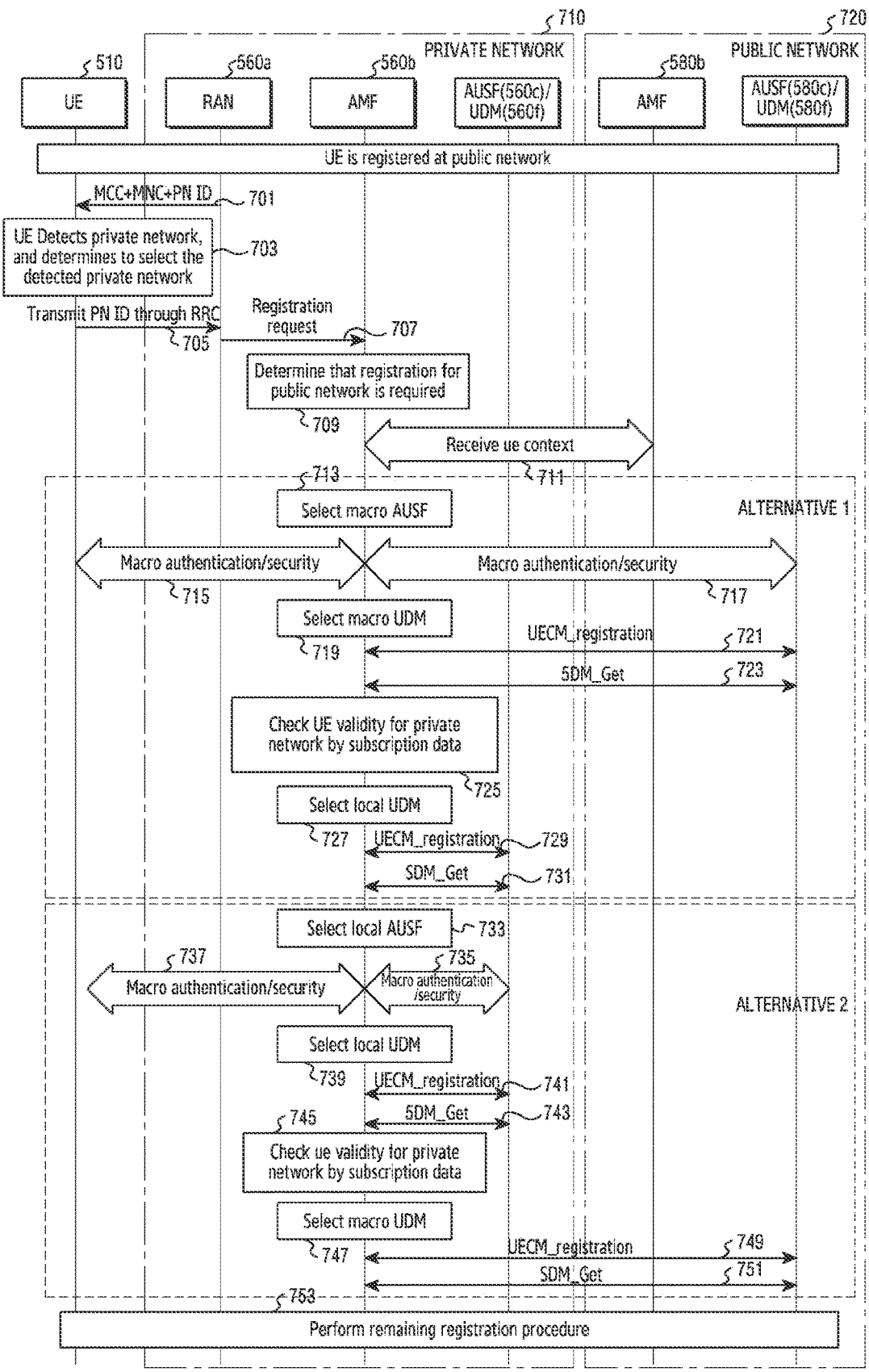
FIG. 7 illustrates a signal flow for a terminal to register at a type A private network if the terminal is registered at a public network in a wireless communication system according to various embodiments of the present disclosure.

FIG. 7 illustrates a signal flow for a UE to register at a type A private network if the UE is registered at a public network in a wireless communication system according to various embodiments of the present disclosure. In FIG. 7, it is assumed that the UE 510 is registered at a public network 720, and a private network 710 may include the type A private network.

Referring to FIG. 7, in step 701, a base station (included in the RAN 560a) of the private network 710 transmits an MCC, an MNC, and a PN ID to the UE 510. For example, the base station may broadcast identification information (i.e., the MCC, the MNC, and the PN ID) of the private network 710 serviced by the base station through a system information block (SIB) message, and the UE 510 may identify the MCC, the MNC and the PN ID included in the SIB message.

In operation 703, the UE 510 may detect the private network 710, and determine to select the detected private network 710. The UE 510 may discover the private network 710 to which the UE 510 is subscribed, identify that the private network 710 is the type A private network managed by the operator of the public network 720 accessed by the UE 510 based on at least one of the identification information (i.e., the MCC, the MNC, and the PN ID) of the private network 710, and select the private network 710.

In step 705, the UE 510 transmits a registration request message to the base station. In other words, the UE selecting the private network 710 may perform a registration procedure to access the private network 710. For example, the UE 510 and the base station may perform radio resource control (RRC) connection setup, and the UE 510 may transmit the registration request message to the base station through the RRC. The UE 510 may set the registration type to the mobility registration in the registration request message, and the registration request message may include at least one of the identification information of the private network 710 and the ID of the UE 510 to indicate the registration for the private network 710. For example, the identification information of the private network 710 may be expressed with a combination of the MCC, the MNC, and the PN ID. As another example, the registration request message may include a private network access indicator indicating that the UE 510 attempts to access the private network 710 instead of the identification information of the private network 710. The ID of the UE 510 may be, for example, a temporary ID (e.g., a globally unique temporary identifier (GUTI)) allocated by the public network 720. In various embodiments, the registration request message may further include a private network UE ID which is a subscriber ID assigned for a subscriber of the private network 710. In various embodiments, to inform the AMF 560b that the UE 510 should register to the public network 720 as well as the private network 710, the UE 510 may set the registration type to 'combined registration' in the registration request message. The combined registration may indicate that the UE 510 is required to register for both of the private network 710 and the public network 720, and may include an indicator for such indication. As another example, to inform the AMF 560b that the UE 510 should register not only at the private network 710 but also at the public network 720, the registration request message may include the identification information of the private network 710 and the identification information of the public network 720 to indicate that the registrations for the private network 710 and the public network 720 are required. In other words, the registration request message may include the identification information of the private network 710 and the identification information of the public network 720, as identification information of a target network for the registration.

In step 707, the base station forwards the registration request message to the AMF 560b. The base station may identify the identification information of the private network 710 from the registration request message received from the UE 510, and forward to the AMF 560b included in the CN of the private network 710 corresponding to the identification information. The base station may forward the registration request message to the AMF 560b through an N2 message, and the forwarded message may include at least one of information indicating that the registration type is the mobility registration, the identification information of the private network 710, and the ID of the UE 510.

In step 709, the AMF 560b determines that the registration for the public network 720 is required. The AMF 560b may determine whether the access management of the UE 510 should be conducted in the public network 720 as well as in the private network 710. The AMF 560b may identify that the private network 710 to which the UE 510 tries to access is managed by the operator of the public network 720 accessed by the UE 510 based at least one of the identification information (i.e., the information indicating that the registration type is the mobility registration, the identification information of the private network 710, and the ID of the UE 510) included in the registration request message, wherein the AMF 560b may determine to manage the access of the UE 510 at not only the private network 710 but also the public network 720 (i.e., determine to require the registration for the public network 720). In various embodiments, if the registration request message includes the indicator indicating that the registration of the UE 510 for the private network 710 and the public network 720 is required (or, if the registration type is set to the 'combined registration' in the registration request message, or if the registration request message includes both of the identification information of the private network 710 and the identification information of the public network 720 as the identification information of the target network for the registration), the AMF 560b may determine to manage the access of the UE 510 at the public network 720 as well as the private network 710.

In step 711, the AMF 560b receives UE context. The AMF 560b may retrieve UE context information pre-registered in the public network 720 from the AMF 580b of the public network 720 using the ID (e.g., the GUTI) of the UE 510 included in the registration request message.

After step 711, steps 713 through 731 may be performed as a first alternative, or steps 733 through 751 may be conducted as a second alternative. In the first alternative, to perform the authentication and authorization processes of the registration process, the AMF 560b may perform the authentication on the private network 710 of the UE 510 via the AUSF 580c and/or the UDM 580f of the public network 720, perform the authorization procedure for checking the validity for the use of the private network 510 of the UE 510 by acquiring the subscription information for using the private network 510 of the UE 510 from the UDM 580f of the public network 720 or the UDM 560f of the private network 710, and update the registration information of the UE 510 in the UDM 560f of the private network 710 or the UDM 580f of the public network 720. In the second alternative, the AMF 560b may perform the authentication of the UE 510 for the private network 710, perform the authorization procedure for checking the validity of the use of the private network 510 of the UE 510 by acquiring the subscription information for using the private network 710 of the UE from the UDM 560f of the private network 710, and update the registration information of the UE 510 in the UDM 560f of the private network 710.

The steps related to the first alternative are as follows.

In step 713, the AMF 560b selects the macro AUSF. In various embodiments, the macro AUSF may be an AUSF (e.g., the AUSF 580c) of the public network 720. The AMF 560b determining to manage the access of the UE 510 not only in the private network 710 but also in the UDM 580f of the public network 720, may select the macro AUSF, if requiring additional authentication. For example, if separate authentication is required for the use of the private network 710, the AMF 560b may select an AUSF which supports the authentication for a UE subscribed to the private network 710 among AUSFs of the public network 720 using the identification information of the private network 710.

In step 715, the AMF 560b may perform the authentication procedure and/or the security procedure on the UE 510. In step 717, the AMF 560b may perform the authentication procedure and/or the security procedure on the macro AUSF. In various embodiments, step 715 may be performed before, after, or together with step 717. Depending on the policy of the private network 710, step 715 and/or step 717 may be omitted.

In step 719, the AMF 560b selects the macro UDM. In various embodiments, the macro UDM may be a UDM (e.g., 580f) of the public network 720. For example, the AMF 560b may select the UDM 580f for managing the subscription information and/or the registration information of the UE 510 in the public network 720.

In step 721, the AMF 560b performs a UE context management (UECM) registration procedure. In the UECM registration procedure, the AMF 560b may update the registration information of the UE 510 to the UDM 580f.

In step 723, the AMF 560b performs a subscriber data management (SDM) acquisition procedure. In the SDM acquisition procedure, the AMF 560b may retrieve the subscription information of the UE 510 from the UDM 580f. For example, the AMF 560b may forward to the UDM 580f the identification information of the private network 710 for which the UE 510 attempts to register, and thus obtain the subscription information of the UE 510 for the private network 710.

In step 725, the AMF 560b checks the validity of the UE 510 for the private network 710 by subscription data obtained from the public network 720. The AMF 560b obtaining the subscription information of the UE 510 for the private network 710 from the UDM 580f of the public network 720 may perform the authorization procedure for checking the validity for using the private network 710 based on the subscription information.

In step 727, the AMF 560b selects a local UDM. In various embodiments, the local UDM may be a UDM (e.g., the UDM 560f) of the private network 710. The AMF 560b may search for the UDM of the private network 710 for the authorized UE 510, and select the searched UDM (e.g., the UDM 560f).

In step 729, the AMF 560b performs the UECM registration procedure. In the UECM registration procedure, the AMF 560b may update the registration information of the UE 510 to the UDM 560f.

In step 731, the AMF 560b performs the SDM acquisition procedure. In the SDM acquisition procedure, the AMF 560b may retrieve the subscription information of the private network 710 for the UE 510 from the UDM 560f. Although not depicted, if the subscription information obtained from the UDM 580f in step 723 is different from the subscription information obtained from the UDM 560f in step 731, the information obtained from the UDM 580f may have a higher priority, or the information obtained from the UDM 560f may have a higher priority according to the operator's policy.

In FIG. 7, the validity check step (step 725) is performed before obtaining the subscription information of the private network 710 from the UDM 560f (step 731), which is exemplary, but the validity check may be conducted after the AMF 560b acquires the subscription information of the UE 510 from the UDM 580f and the subscription information of the UE 510 from the UDM 560f. In other words, step 725 may be performed after step 731.

The sequence of the steps related to the first alternative described above is exemplary, and various modifications may be made. For example, the AMF 560b may perform the additional authentication procedure on the UE 510 with the AUSF 580c of the public network 720 in step 717, then search for the UDM 560f of the private network 710 and update the registration information of the UE 510 to the searched UDM 560f, and receive the subscription information of the UE 510 in the private network 710 from the UDM 560f. For the AMF 560b to retrieve the UDM 560f of the private network 710, the AMF 560b may use the identification information of the private network 710. In other words, the AMF 560b may search for the UDM 560f suitable for the private network 710 using the identification information of the private network 710. In various embodiments, the identification information of the private network 710 may be expressed with at least one of the MCC, the MNC, and the PN ID, or a combination of at least two of the MCC, the MNC, and the PN ID. The AMF 560b selecting the UDM 560c of the private network 710 may obtain the subscription information of the UE 510 for the private network 710 from the UDM 560f of the private network 710, and perform the authorization procedure for checking the validity for the use of the private network 710 of the UE 510 based on the subscription information. In addition, to maintain the registration for the public network 720, the AMF 560b may select the UDM 580f managing the subscription information and the registration information of the UE 510 in the public network 720, update the registration information of the UE 510 to the selected UDM 580f, and receive the subscription information of the UE 510 from the UDM 580f.

The steps related to the second alternative are as follows.

The AMF 560b which determines to manage the access of the UE 510 in the public network 720 as well as in the private network 710 in step 709, selects a local AUSF in step 733. In various embodiments, the local AUSF may be an AUSF (e.g., the AUSF 560c) of the private network 710. If the authentication of the UE 510 is required in the private network 710, the AMF 560b may select the AUSF 560c. For example, if requiring separate authentication for using the private network 710, the AMF 560b may select an AUSF supporting the authentication of the UE subscribed to the private network 710 among AUSFs of the private network 710.

In step 735, the AMF 560b may perform the authentication procedure and/or the security procedure for the selected AUSF 560c. In step 737, the AMF 560b may perform the authentication procedure and/or the security procedure for the UE 510. In various embodiments, step 737 may be performed before, after, or together with step 735. Depending on the policy of the private network 710, step 735 and/or step 737 may be omitted, or replaced for the authentication through the public network 720. If the authentication process of the UE 510 for the private network 710 in steps 735 and 737 is replaced for the authentication through the public network 720, steps 713 and 719 may be performed instead of steps 733 and 739, and the UE 510 authenticated for the public network 720 may be considered as passing the authentication for the private network 710 as well.

In step 739, the AMF 560b selects a local UDM (e.g., the UDM 560f). The AMF 560b may select the UDM 560f which manages the subscription information and/or the registration information of the UE in the private network 710.

The AMF 560b determining to manage the access of the UE 510 in the public network 720 as well as the private network 710 in step 709 performs the UECM registration procedure, in step 741. In the UECM registration procedure, the AMF 560b may update the registration information of the UE 510 to the UDM 560f.

In step 743, the AMF 560b performs the SDM acquisition procedure. In the SDM acquisition procedure, the AMF 560b may retrieve the subscription information of the private network 710 for the UE 510 from the UDM 560f.

In step 745, the AMF 560b checks the validity of the UE 510 in the private network 710 by subscription data. In other words, the AMF 560b may check the validity of the UE 510 for the private network 710 based on the subscription data obtained from the private network 710. The AMF 560b obtaining the subscription information of the UE 510 for the private network 710 from the UDM 560f may perform the authorization procedure for checking the validity for the use of the private network 710 based on the subscription information.

In step 747, the AMF 560b selects a macro UDM (e.g., the UDM 580f). The AMF 560b may search for the UDM 580f of the public network 720 for the authorized UE 510, and select the searched UDM 580f.

In step 749, the AMF 560b performs the UECM registration procedure. In the UECM registration procedure, the AMF 560b may update the registration information of the UE 510 to the UDM 580f.

In step 751, the AMF 560b performs the SDM acquisition procedure. In the SDM acquisition procedure, the AMF 560b may retrieve the subscription information of the private network 710 for the UE 510 from the UDM 580f. For example, the AMF 560b may forward to the UDM 580f the identification information of the private network 710 for which the UE 510 attempts to register, and thus acquire the subscription information of the UE 510 for the private network 710. Although not depicted, if the subscription information obtained from the UDM 560f in step 741 is different from the subscription information obtained from the UDM 580f in step 751, the information obtained from the UDM 580f may have a higher priority, or the information obtained from the UDM 560f may have a higher priority according to the operator's policy.

In FIG. 7, the validity check step (step 745) is performed before obtaining the subscription information of the private network 710 from the UDM 560f (step 751), which is exemplary, but the validity check may be conducted after the AMF 560b obtains the subscription information of the UE 510 from the UDM 560f and the subscription information of the UE 510 from the UDM 580f. In other words, step 745 may be performed after step 751.

In step 753, the AMF 560b performs the remaining registration procedure. For example, the AMF 560b may perform the authorization and authentication procedures for registration of the UE 510, and then forward a registration accept message to the UE 510 according to results of the authorization and the authentication (if the authorization and the authentication are successful). The registration accept message may include information indicating that the UE 510 is successfully registered for the private network 710, and information indicating that the UE 510 is successfully registered for the public network 720. For example, the registration accept message may include information expressed as 'registration result="registered to both public and private network"'.

According to various embodiments, as shown in FIG. 7, the procedures and/or the steps for registering the UE 510 at the private network 710 may be applied if the UE 510 registers for the type A private network (hereafter, referred to as the type A private network associated with a roaming network) managed by an operator of a public network (hereafter, referred to as the roaming network) which establishes a roaming agreement with the operator of the public network to which the UE 510 is subscribed, though the UE 510 is not subscribed thereto. For example, the procedure for the UE 510 to register for the type A private network associated with the roaming network is as follows.

The UE 510 may discover the private network, identify that the private network is a private network to which the UE 510 is not directly subscribed but is associated with the roaming network based on the identification information of the private network, determine to select the identified private network, and perform the registration process such as the procedures and/or the steps for registering the UE 510 to the private network 710 as described in FIG. 7 to access the network.

Figure 8:
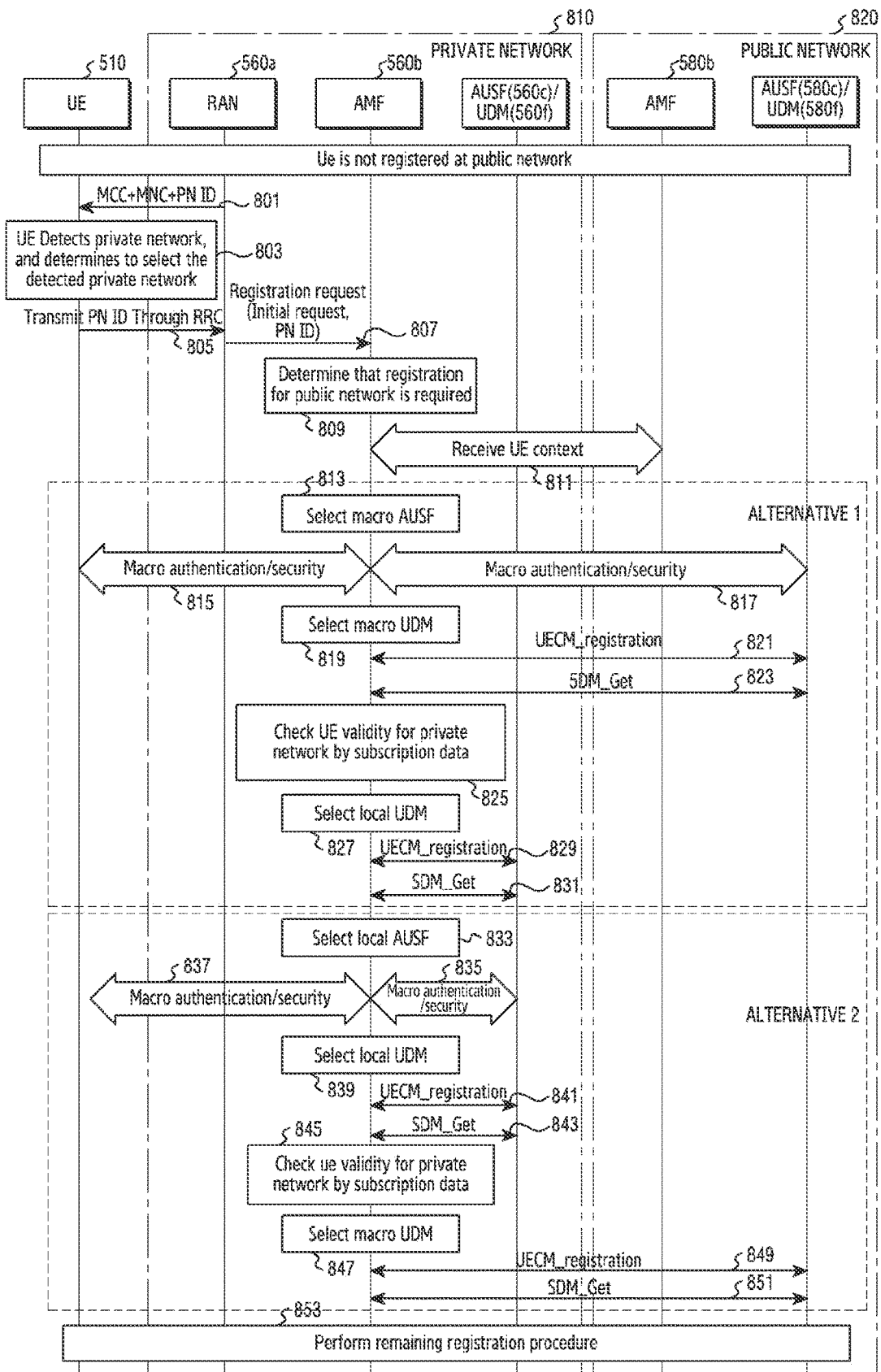
FIG. 8 illustrates a signal flow for a terminal to register at a type A private network if the terminal is not registered at a public network in a wireless communication system according to various embodiments of the present disclosure.

FIG. 8 illustrates a signal flow for a UE to register for a type A private network if the UE is not registered at a public network in a wireless communication system according to various embodiments of the present disclosure. In FIG. 7, it is assumed that the UE 510 is not registered at a public network 820, and a network 810 may include the type A private network.

Referring to FIG. 8, in step 801, a base station (included in the RAN 560a) of the private network 810 transmits the MCC, the MNC, and the PN ID to the UE 510. For example, the base station may broadcast identification information (i.e., the MCC, the MNC and the PN ID) of the private network 810 serviced by the base station through an SIB message, and the UE 510 may identify the MCC, the MNC and the PN ID included in the SIB message.

In operation 803, the UE 510 may detect the private network 810, and determine to select the detected private network 810. The UE 510 may discover the private network 810 to which the UE 510 is subscribed, identify that the private network 810 is the type A private network managed by the operator of the public network 810 to which the UE 510 is subscribed based on at least one of the identification information (i.e., the MCC, the MNC, and the PN ID) of the private network 810, and determine to select the private network 810.

In step 805, the UE 510 transmits a registration request message to the base station. In other words, the UE selecting the private network 810 may perform a registration procedure to access the private network 810. For example, the UE 510 and the base station may perform RRC connection establishment, and the UE 510 may transmit the registration request message to the base station through the RRC. The UE 510 may set the registration type to the initial registration in the registration request message, and the registration request message may include at least one of the identification information of the private network 810 and the ID of the UE 510 to indicate the registration for the private network 810. For example, the identification information of the private network 810 may be expressed with a combination of the MCC, the MNC, and the PN ID. As another example, the registration request message may include a private network access indicator indicating that the UE 510 attempts to access the private network 810 instead of the identification information of the private network 810. The ID of the UE 510 may be, for example, a temporary ID (e.g., a GUTI) assigned by the public network 820, or a subscriber ID (e.g., a subscriber unique temporary identifier (SUTI)) assigned by the public network 820. In various embodiments, the registration request message may further include a private network UE ID which is a subscriber ID assigned for a subscriber of the private network 810. In various embodiments, to inform the AMF 560b that the UE 510 should register not only for the private network 810 but also for the public network 820, the UE 510 may set the registration type to the 'combined registration' in the registration request message. The combined registration may indicate that the UE 510 is required to register for both of the private network 810 and the public network 820, and may include an indicator for such indication. As another example, to inform the AMF 560b that the UE 510 should register not only for the private network 810 but also for the public network 820, the registration request message may include the identification information of the private network 810 and the identification information of the public network 820 to indicate that the registrations to the private network 810 and the public network 820 are required. In other words, the registration request message may include the identification information of the private network 810 and the identification information of the public network 820, as identification information of a target network for the registration.

In step 807, the base station forwards the registration request message to the AMF 560b. The base station may identify the identification information of the private network 810 from the registration request message received from the UE 510, and forward to the AMF 560b included in the CN of the private network 810 corresponding to the identification information. The base station may forward the registration request message to the AMF 560b through an N2 message, and the forwarded message may include at least one of information indicating that the registration type is the initial registration, the identification information of the private network 810, and the ID of the UE 510.

In step 809, the AMF 560b determines that the registration for the public network 820 is required. The AMF 560b may determine whether to manage the access of the UE 510 in the public network 820 as well as in the private network 810. The AMF 560b may identify that the private network 810 to which the UE 510 tries to access is managed by the operator of the public network 820 subscribed by the UE 510 based at least one of the identification information (i.e., the information indicating that the registration type is the initial registration, the identification information of the private network 810, the ID of the UE 510 and/or the private network UE ID) included in the registration request message, wherein the AMF 560b may determine to manage the access of the UE 510 at not only the private network 810 but also the public network 820 (i.e., determine to require the registration for the public network 820). In various embodiments, if the registration request message includes the indicator indicating that the registrations of the UE 510 for the private network 810 and the public network 820 are required (or, if the registration type is set to the 'combined registration' in the registration request message, or if the registration request message includes both the identification information of the private network 810 and the identification information of the public network 820 as the identification information of the target network for the registration), the AMF 560b may determine to manage the access of the UE 510 at the public network 820 as well as the private network 810. In step 811, the AMF 560b receives UE context. The AMF 560b may retrieve UE context information pre-registered in the public network 820 from the AMF 580b of the public network 820, using the ID (e.g., the GUTI and/or the SUTI) of the UE 510 included in the registration request message.

After step 811 is performed, steps 813 through 831 may be conducted as a first alternative, or steps 833 through 851 may be performed as a second alternative. In the first alternative, to perform the authentication and authorization processes of the registration process, the AMF 560b may perform the authentication on the private network 810 of the UE 510 via the AUSF 580c and/or the UDM 580f of the public network 820, perform the authorization procedure for checking the validity for the use of the private network 510 of the UE 510 by acquiring the subscription information for using the private network 510 of the UE 510 from the UDM 580f of the public network 820 or the UDM 560f of the private network 810, and update the registration information of the UE 510 in the UDM 560f of the private network 810 or the UDM 580f of the public network 820. In the second alternative, the AMF 560b may perform the authentication of the UE 510 for the private network 810 through the AUSF 560c and/or the UDM 560f of the private network 810, perform the authorization procedure for checking the validity for the use of the private network 510 of the UE 510 by acquiring the subscription information for the use of the UE 510 for the private network 810 from the UDM 560f of the private network 810, and update the registration information of the UE 510 in the UDM 560f of the private network 810.

The steps related to the first alternative are as follows.

In step 813, the AMF 560b selects the macro AUSF. In various embodiments, the macro AUSF may be an AUSF (e.g., the AUSF 580c) of the public network 820. The AMF 560b determining to manage the access of the UE 510 not only in the private network 810 but also in the UDM 580f of the public network 820, may select the macro AUSF, if requiring additional authentication. For example, if separate authentication is required for the use of the private network 810, the AMF 560b may select the AUSF which supports the authentication for the UE subscribed to the private network 810 among AUSFs of the public network 820 using the identification information of the private network 810.

In step 815, the AMF 560b may perform the authentication procedure and/or the security procedure on the UE 510. In step 817, the AMF 560b may perform the authentication procedure and/or the security procedure for the macro AUSF. In various embodiments, step 815 may be performed before, after, or together with step 817. Depending on the policy of the private network 810, step 815 and/or step 817 may be omitted.

In step 819, the AMF 560b selects the macro UDM. In various embodiments, the macro UDM may be a UDM (e.g., 580f) of the public network 820. For example, the AMF 560b may select the UDM 580f for managing the subscription information and/or the registration information of the UE 510 in the public network 820.

In step 821, the AMF 560b performs the UECM registration procedure. In the UECM registration procedure, the AMF 560b may update the registration information of the UE 510 to the UDM 580f.

In step 823, the AMF 560b performs the SDM acquisition procedure. In the SDM acquisition procedure, the AMF 560b may retrieve the subscription information of the UE 510 from the UDM 580f. For example, the AMF 560b may forward to the UDM 580f the identification information of the private network 810 to which the UE 510 attempts to register, and thus acquire the subscription information of the UE 510 for the private network 810.

In step 825, the AMF 560b checks the validity of the UE 510 for the private network 810 by subscription data acquired from the public network 820. The AMF 560b obtaining the subscription information of the UE 510 for the private network 810 from the UDM 580f of the public network 820 may perform the authorization procedure for checking the validity of the use of the private network 810 based on the subscription information.

In step 827, the AMF 560b selects a local UDM. In various embodiments, the local UDM may be a UDM (e.g., the UDM 560f) of the private network 810. The AMF 560b may search for the UDM of the private network 810 for the authorized UE 510, and select the searched UDM (e.g., the UDM 560f).

In step 829, the AMF 560b performs the UECM registration procedure. In the UECM registration procedure, the AMF 560b may update the registration information of the UE 510 to the UDM 560f.

In step 831, the AMF 560b performs the SDM acquisition procedure. In the SDM acquisition procedure, the AMF 560b may retrieve the subscription information of the private network 810 for the UE 510 from the UDM 560f. Although not depicted, if the subscription information obtained from the UDM 580f in step 823 is different from the subscription information obtained from the UDM 560f in step 831, the information obtained from the UDM 580f may have a higher priority, or the information obtained from the UDM 560f may have a higher priority according to the operator's policy.

In FIG. 8, the validity check step (step 825) is performed before obtaining the subscription information of the private network 810 from the UDM 560f (step 831), which is exemplary, but the validity check may be conducted after the AMF 560b acquires the subscription information of the UE 510 from the UDM 580f and the subscription information of the UE 510 from the UDM 560f. In other words, step 825 may be performed after step 831.

The sequence of the steps related to the first alternative described above is exemplary, and various modifications may be made. For example, the AMF 560b may perform the additional authentication procedure on the UE 510 with the AUSF 580c of the public network 820 in step 817, then search for the UDM 560f of the private network 810 and update the registration information of the UE 510 to the searched UDM 560f, and receive the subscription information of the UE 510 in the private network 810 from the UDM 560f. For the AMF 560b to search for the UDM 560f of the private network 810, the AMF 560b may use the identification information of the private network 810. In other words, the AMF 560b may search for the UDM 560f suitable for the private network 810 using the identification information of the private network 810. In various embodiments, the identification information of the private network 810 may be expressed with at least one of the MCC, the MNC, and the PN ID, or a combination of at least two of the MCC, the MNC, and the PN ID. The AMF 560b selecting the UDM 560c of the private network 810 may obtain the subscription information of the UE 510 for the private network 810 from the UDM 560f of the private network 810, and perform the authorization procedure for checking the validity of the use of the private network 810 of the UE 510 based on the subscription information. In addition, to maintain the registration for the public network 820, the AMF 560b may select the UDM 580f managing the subscription information and the registration information of the UE 510 in the public network 820, update the registration information of the UE 510 to the selected UDM 580f, and receive the subscription information of the UE 510 from the UDM 580f. The steps related to the second alternative are as follows.

The AMF 560b which determines to manage the access of the UE 510 in the public network 820 as well as in the private network 810 in step 809, selects a local AUSF, in step 833. In various embodiments, the local AUSF may be an AUSF (e.g., the AUSF 560c) of the private network 810. If the authentication of the UE 510 is required in the private network 810, the AMF 560b may select the AUSF 560c. For example, if requiring separate authentication for using the private network 810, the AMF 560b may select the AUSF supporting the authentication of the UE subscribed to the private network 810 among AUSFs of the private network 810.

In step 835, the AMF 560b may perform the authentication procedure and/or the security procedure for the selected AUSF 560c. In step 837, the AMF 560b may perform the authentication procedure and/or the security procedure for the UE 510. In various embodiments, step 837 may be performed before, after, or together with step 835. Depending on the policy of the private network 810, step 835 and/or step 837 may be omitted, or replaced for the authentication through the public network 820. If the authentication process of the UE 510 for the private network 810 is replaced for the authentication through the public network 820 as in steps 835 and 837, steps 813 and 819 may be performed instead of steps 833 and 839, and the UE 510 authenticated for the public network 820 may be considered as passing the authentication for the private network 810 as well.

In step 839, the AMF 560b selects a local UDM (e.g., the UDM 560f). The AMF 560b may select the UDM 560f which manages the subscription information and/or the registration information of the UE in the private network 810.

The AMF 560b determining to manage the access of the UE 510 in the public network 820 as well as the private network 810 in step 809 performs the UECM registration procedure, in step 841. In the UECM registration procedure, the AMF 560b may update the registration information of the UE 510 to the UDM 560f.

In step 843, the AMF 560b performs the SDM acquisition procedure. In the SDM acquisition procedure, the AMF 560b may retrieve the subscription information of the private network 810 for the UE 510 from the UDM 560f.

In step 845, the AMF 560b checks the validity of the UE 510 in the private network 810 by subscription data. In other words, the AMF 560b may check the validity of the UE 510 for the private network 810 based on the subscription data obtained from the private network 810. The AMF 560b obtaining the subscription information of the UE 510 for the private network 810 from the UDM 560f may perform the authorization procedure for checking the validity for the use of the private network 810 based on the subscription information.

In step 847, the AMF 560b selects a macro UDM (e.g., the UDM 580f). The AMF 560b may search for the UDM 580f of the public network 820 for the authorized UE 510, and select the searched UDM 580f.

In step 849, the AMF 560b performs the UECM registration procedure. In the UECM registration procedure, the AMF 560b may update the registration information of the UE 510 to the UDM 580f.

In step 851, the AMF 560b performs the SDM acquisition procedure. In the SDM acquisition procedure, the AMF 560b may retrieve the subscription information of the private network 810 for the UE 510 from the UDM 580f. For example, the AMF 560b may forward to the UDM 580f the identification information of the private network 810 to which the UE 510 attempts to register, and thus acquire the subscription information of the UE 510 for the private network 810. Although not depicted, if the subscription information obtained from the UDM 560f in step 841 is different from the subscription information obtained from the UDM 580f in step 851, the information obtained from the UDM 580f may have a higher priority, or the information obtained from the UDM 560f may have a higher priority according to the operator's policy.

In FIG. 8, the validity check step (step 845) is performed before obtaining the subscription information of the private network 810 from the UDM 560f (step 851), which is exemplary, but the validity check may be performed after the AMF 560b obtains the subscription information of the UE 510 from the UDM 560f and the subscription information of the UE 510 from the UDM 580f. In other words, step 845 may be performed after step 851.

In step 853, the AMF 560b performs the remaining registration procedure. For example, the AMF 560b may perform the authorization and authentication procedures for registration of the UE 510, and then forward a registration accept message to the UE 510 according to results of the authorization and the authentication (if the authorization and the authentication are successful). The registration accept message may include information indicating that the UE 510 is successfully registered to the private network 810, and information indicating that the UE 510 is successfully registered to the public network 820. For example, the registration accept message may include information expressed as 'registration result="registered to both public and private network"'.

According to various embodiments, as shown in FIG. 8, the procedures and/or steps for registering the UE 510 to the private network 810 may be applied if the UE 510 registers for the type A private network (hereafter, referred to as the type A private network associated with a roaming network) managed by an operator of a public network (hereafter, referred to as the roaming network) which establishes a roaming agreement with the operator of the public network to which the UE 510 is subscribed, though the UE 510 is not subscribed thereto. For example, the procedure for the UE 510 to register at the type A private network associated with the roaming network is as follows.

The UE 510 may discover the private network, identify that the private network is a private network to which the UE 510 is not directly subscribed but is associated with the roaming network based on the identification information of the private network, determine to select the identified private network, and perform the registration process such as the procedures and/or the steps for registering the UE 510 to the private network 810 as described in FIG. 8 to access the network.

Figure 9:
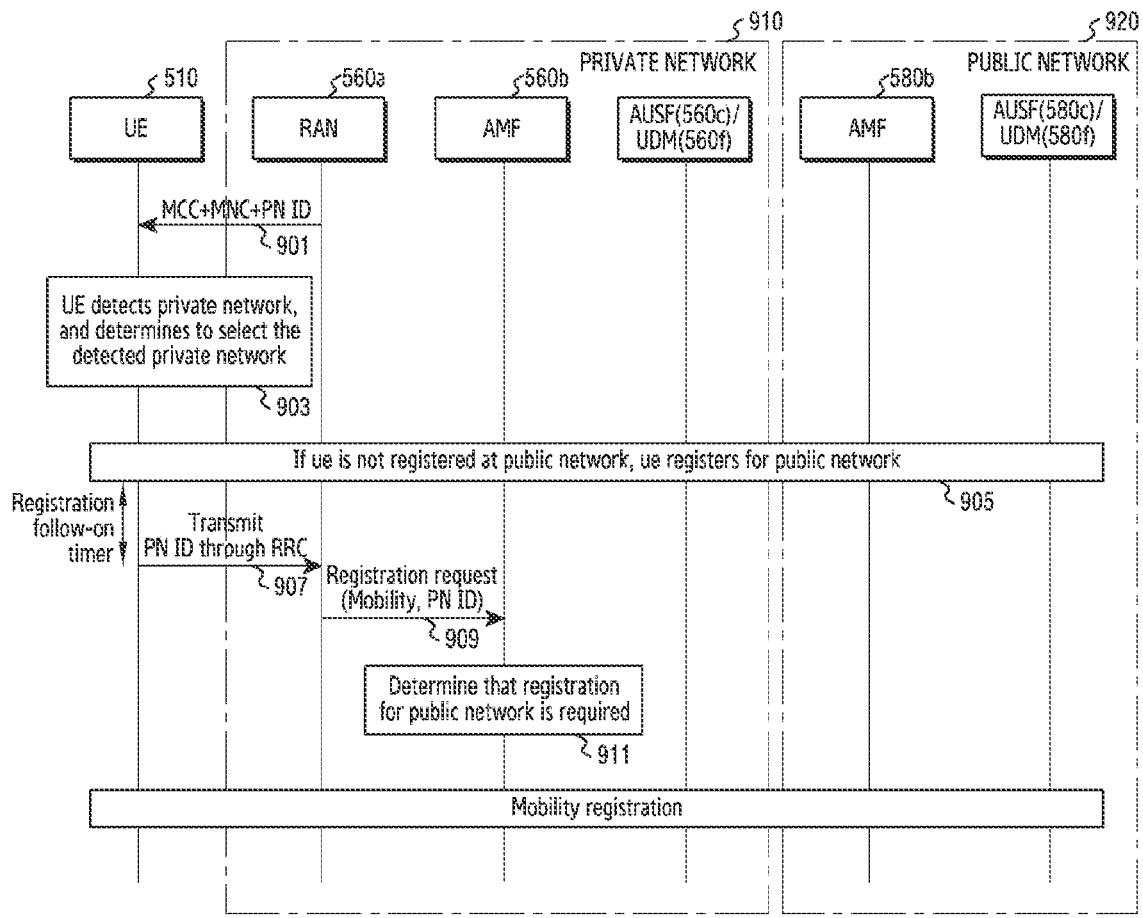
FIG. 9 illustrates a signal flow for a terminal to register at a type A private network if the terminal is not registered at a public network in a wireless communication system according to various embodiments of the present disclosure.

FIG. 9 illustrates a signal flow for a UE to register for a type A private network if the UE is not registered at a public network in a wireless communication system according to various embodiments of the present disclosure. In FIG. 9, a private network 910 may include the type A private network.

Referring to FIG. 9, in step 901, a base station (included in the RAN 560a) of the private network 910 transmits the MCC, the MNC, and the PN ID to the UE 510. For example, the base station may broadcast identification information (i.e., the MCC, the MNC, and the PN ID) of the private network 910 serviced by the base station through an SIB message, and the UE 510 may identify the MCC, the MNC, and the PN ID included in the SIB message.

In operation 903, the UE 510 may detect the private network 910, and determine to select the detected private network 910. The UE 510 may discover the private network 910 to which the UE 510 subscribes, identify that the private network 910 is the type A private network managed by the operator of the public network to which the UE 510 is subscribed based on at least one of the identification information (i.e., the MCC, the MNC, and the PN ID) of the private network 910, and determine to select the private network 910.

In step 905, if the UE 510 is not registered at the public network 920, the UE 510 performs a procedure for registering to the public network 920. Since the UE 510 is in a situation where the UE 510 is not connected and/or registered to the public network 920 and is not serviced through the public network 920, the UE 510 may register at the public network 920 according to a general registration procedure (e.g., a registration procedure specified in 3GPP TS23.502).

In operation 907, the UE 510 transmits a registration request message to the base station. For example, the UE 510 and the base station may perform RRC connection establishment, and the UE 510 may transmit the registration request message to the base station through the RRC. After the access of the UE 510 to the public network 920 is completed, the UE 510 may perform the mobility registration for the private network 910 before the registration follow-on timer indicating that additional registration to the private network 910 is required expires, and transmit the registration request message to the base station for the mobility registration. The registration follow-on timer may start from a time when the UE 510 determines to register for the private network 910 or from a time when the UE 510 finishes the registration for the public network 920. The UE 510 may set the registration type to the mobility registration in the registration request message, and the registration request message may include at least one of the identification information of the private network 910 and the ID of the UE 510 to indicate the registration for the private network 910. For example, the identification information of the private network 910 may be expressed with a combination of the MCC, the MNC, and the PN ID. As another example, the registration request message may include a private network access indicator indicating that the UE 510 attempts to access the private network 910 instead of the identification information of the private network 910. The ID of the UE 510 may be, for example, a temporary ID (e.g., the GUTI) assigned by the public network 920, or a subscriber ID (e.g., the SUTI) assigned by the public network 920. In various embodiments, the registration request message may further include a private network UE ID which is a subscriber ID assigned for a subscriber of the private network 910. In various embodiments, to notify the AMF 560b that the UE 510 should register at not only the private network 910 but also the public network 920, the UE 510 may set the registration type to the 'combined registration' in the registration request message. The combined registration may indicate that the UE 510 is required to register for both the private network 910 and the public network 920, and may include an indicator for this indication. As another example, to notify the AMF 560b that the UE 510 should register not only at the private network 910 but also at the public network 920, the registration request message may include the identification information of the private network 910 and the identification information of the public network 920 to indicate that the registrations to the private network 910 and the public network 920 are required. In other words, the registration request message may include, as the identification information of the target network for the registration, the identification information of the private network 910 and the identification information of the public network 920.

In step 909, the base station forwards the registration request message to the AMF 560b. The base station may identify the identification information of the private network 910 from the registration request message received from the UE 510, and forward to the AMF 560b included in the CN of the private network 910 corresponding to the identification information. The base station may forward the registration request message to the AMF 560b through an N2 message, and the forwarded message may include at least one of information indicating that the registration type is the initial registration, the identification information of the private network 910, and the ID of the UE 510.

In step 911, the AMF 560b determines that the registration for the public network 920 is required. The AMF 560b may determine whether to manage the access of the UE 510 in the public network 920 as well as the private network 910. The AMF 560b may identify that the private network 910 which the UE 510 attempts to access is managed by the operator of the public network 920 to which the UE 510 is subscribed based on at least one of the identification information (i.e., the information indicating that the registration type is the initial registration, the identification information of the private network 910, the ID of the UE 510 and/or the private network UE ID) included in the registration request message, wherein the AMF 560b may determine to manage the access of the UE 510 in the public network 920 as well as the private network 910 (i.e., determine that the registration at the public network 920 is required).

Steps after step 911 are identical to steps after step 709 of FIG. 7.

Figure 10:
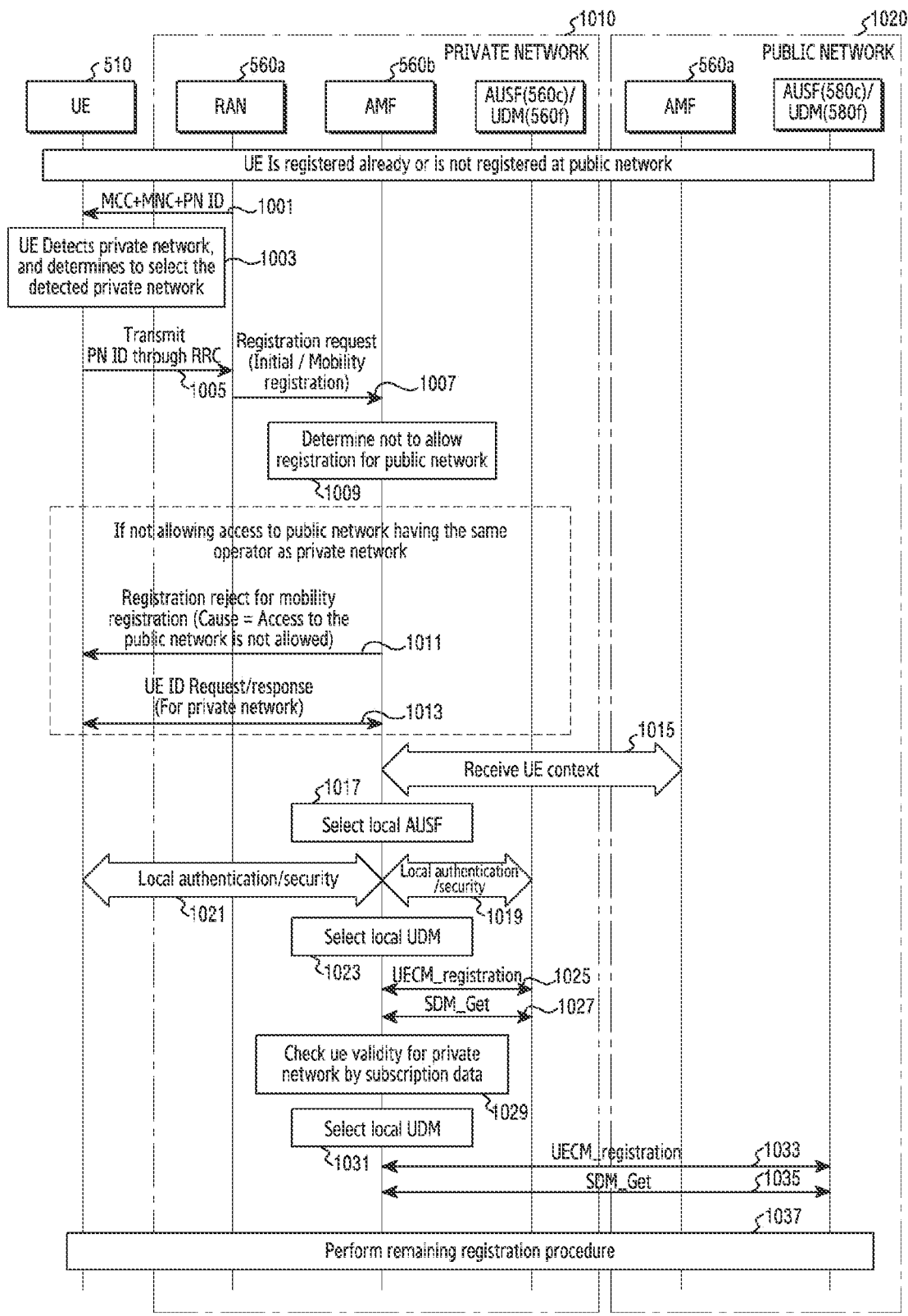
FIG. 10 illustrates a signal flow for a terminal to register at a type A private network if the terminal is not subscribed to a public network in a wireless communication system according to various embodiments of the present disclosure.

FIG. 10 illustrates a signal flow for a UE to register for a type A private network associate with a public network to which the UE is not subscribed, rather than a roaming network for the UE in a wireless communication system according to various embodiments of the present disclosure. In FIG. 9, it is assumed that the UE 510 is connected and/or registered to a public network 1020 and serviced by the public network 1020, or is not connected to the public network 1020, and a private network 1010 may include the type A private network.

Referring to FIG. 10, in step 1001, a base station (included in the RAN 560a) of the private network 1010 transmits the MCC, the MNC, and the PN ID to the UE 510. For example, the base station may broadcast identification information (i.e., the MCC, the MNC and the PN ID) of the private network 1010 serviced by the base station through an SIB message, and the UE 510 may identify the MCC, the MNC and the PN ID included in the SIB message.

In operation 1003, the UE 510 may detect the private network 1010, and determine to select the detected private network 1010. The UE 510 may discover the private network 810 to which the UE 510 is subscribed, identify that the private network 1010 is the type A private network managed by the operator of the public network 820 to which the UE 510 is subscribed based on at least one of the identification information (i.e., the MCC, the MNC, and the PN ID) of the private network 1010, and determine to select the private network 1010.

In step 1005, the UE 510 transmits a registration request message to the base station. In other words, the UE selecting the private network 1010 may perform a registration procedure to access the private network 1010. For example, the UE 510 and the base station may perform the RRC connection establishment, and the UE 510 may transmit the registration request message to the base station through the RRC. The UE 510 may set the registration type to the initial registration or the mobility registration in the registration request message, and the registration request message may include at least one of the identification information of the private network 1010 and the ID of the UE 510 to indicate the registration for the private network 1010. For example, the identification information of the private network 1010 may be expressed with a combination of the MCC, the MNC, and the PN ID. As another example, the registration request message may include a private network access indicator indicating that the UE 1010 attempts to access the private network 1010 instead of the identification information of the private network 1010. The ID of the UE 510 may be, for example, a temporary ID (e.g., the GUTI) assigned by the public network 1020, or a subscriber ID (e.g., the SUTI) assigned by the public network 1020. In various embodiments, the registration request message may further include a private network UE ID which is a subscriber ID assigned for a subscriber of the private network 1010, or may instead include the temporary ID. In various embodiments, instead of the private network UE ID, an unencrypted SUPI may be used as the ID of the UE 510, as the SUPI which is the subscriber ID assigned in the public network to which the UE 510 subscribes. In addition, the encrypted SUPI may be used as the ID of the UE 510, as the SUPI which is the subscriber ID assigned in the public network to which the UE 510 is subscribed according to an encryption rule shared between the UE 510 and the private network 1010.

In step 1007, the base station forwards the registration request message to the AMF 560*b*. The base station may identify the identification information of the private network 1010 from the registration request message received from the UE 510, and forward to the AMF 560*b* included in the CN of the private network 1010 corresponding to the identification information. The base station may forward the registration request message to the AMF 560*b* through an N2 message, and the forwarded message may include at least one of information indicating that the registration type is the initial registration or the mobility registration, the identification information of the private network 1010, and the ID of the UE 510.

In step 1009, the AMF 560*b* determines not to allow the registration for the public network 1020. The AMF 560*b* may determine whether to manage the access of the UE 510 in the public network 1020 as well as in the private network 1010. The AMF 560*b* may identify that the private network 1010 to which the UE 510 tries to access is managed by the operator of the public network 1020 not subscribed by the UE 510 based at least one of the identification information (i.e., the information indicating that the registration type is the mobility registration or the initial registration, the identification information of the private network 1010, the ID of the UE 510 and/or the private network UE ID) included in the registration request message, and if the public network 1020 is not the roaming network, the AMF 560*b* may determine that the registration of the UE 510 for the private network 1010 is required, and not to allow the registration for the public network 1020 to which the UE 510 is not subscribed.

If the access to the public network 1020 having the same operator as the private network 1010 is not allowed, steps 1011 and 1013 may be performed.

In step 1011, the AMF 560*b* forwards a registration reject message for the mobility registration to the UE 510. For example, if the UE 510 attempts the mobility registration, the AMF 560*b* may transmit to the UE 510 the registration reject message including information expressed as 'cause="access to the public network is not allowed"'. After the UE 510 receives the registration reject message, the UE 510 may be triggered to attempt the initial registration for the private network 1010.

In step 1013, the AMF 560*b* may request the ID of the UE 510 for the private network 1010 to the UE 510, and receive the ID of the UE 510 from the UE 510 in response. For example, if the AMF 560*b* does not obtain from the UE 510 the ID of the UE 510 usable by the UE 510 in the private network 1010 through the registration message, the AMF 560*b* may request the ID of the UE 510 for the private network 1010 to the UE 510, and receive the ID of the UE 510 from the UE 510 in response. The request message for requesting the ID of the UE 510 may include the identification information of the private network 1010 to indicate that the ID for the private network 1010 is requested.

Although not depicted, steps 1011 and 1013 may be performed selectively. In other words, step 1011 or step 1013 may be omitted.

In step 1015, the AMF 560*b* receives UE context. The AMF 560*b* may retrieve UE context information pre-registered in the public network 1020 from the AMF 580*b* of the public network 1020 using the ID (e.g., the GUTI and/or the SUTI) of the UE 510 included in the registration request message.

The AMF 560*b* may perform the authentication on the private network 1010 of the UE 510, perform the authorization procedure for checking the validity for the use of the private network 1010 of the UE 510 by acquiring subscription information for using the private network 1010 of the UE from the UDM 580*f* of the private network 1010, and update the registration information of the UE 510 in the UDM 560*f* of the private network 1010. Operations of the AMF 560*b* for doing so may be performed through steps to be described.

In step 1017, the AMF 560*b* selects a local AUSF. In various embodiments, the local AUSF may be an AUSF (e.g., the AUSF 560*c*) of the private network 1010. If the AMF 560*b* performs the authentication for the UE 510 in the private network 1010, the AMF 560*b* may select the AUSF 560*c*. For example, if the AMF 560*b* performs separate authentication for using the private network 1010, the AMF 560*b* may select the AUSF which supports the authentication for a UE subscribed to the private network 1010 among AUSFs of the private network 1010.

In step 1019, the AMF 560*b* may perform the authentication procedure and/or the security procedure for the selected AUSF 560*c*. In step 1021, the AMF 560*b* may perform the authentication procedure and/or the security procedure for the UE 510. In various embodiments, step 1019 may be performed before, after, or together with step 1021.

In step 1023, the AMF 560*b* selects a local UDM (e.g., the UDM 560*f*). The AMF 560*b* may select the UDM 560*f* which manages the subscription information and/or the registration information of the UE in the private network 1010.

In step 1025, the AMF 560*b* performs a UECM registration procedure. In the UECM registration procedure, the AMF 560*b* may update the registration information of the UE 510 to the UDM 560*f*.

In step 1027, the AMF 560b performs an SDM acquisition procedure. In the SDM acquisition procedure, the AMF 560b may retrieve the subscription information of the private network 1010 for the UE 510 from the UDM 560f.

In step 1029, the AMF 560b checks the validity of the UE 510 in the private network 1010 by subscription data. In other words, the AMF 560b may check the validity of the UE 510 for the private network 1010 based on the subscription data obtained from the private network 1010. The AMF 560b obtaining the subscription information of the UE 510 for the private network 1010 from the UDM 560f may perform the authorization procedure for checking the validity for the use of the private network 1010 based on the subscription information.

In step 1031, the AMF 560b selects a macro UDM (e.g., the UDM 580f). The AMF 560b may search for the UDM 580f of the public network 1020 to which the UE 510 is subscribed with respect to the authorized UE 510, and select the searched UDM 580f.

In step 1033, the AMF 560b performs the UECM registration procedure. In the UECM registration procedure, the AMF 560b may update the registration information of the UE 510 to the UDM 580f.

In step 1035, the AMF 560b performs the SDM acquisition procedure. In the SDM acquisition procedure, the AMF 560b may retrieve the subscription information of the private network 1010 for the UE 510 from the UDM 580f.

In step 1037, the AMF 560b performs the remaining registration procedure. For example, the AMF 560b may perform the authorization and authentication procedures for registration of the UE 510, and then forward a registration accept message to the UE 510 according to results of the authorization and the authentication (if the authorization and the authentication are successful). The registration accept message may include information indicating that the UE 510 is successfully registered to the private network 1010, and information indicating the successful registration to the public network 1020. For example, the registration accept message may include information expressed as 'registration result="registered to both public and private network"'. In various embodiments, the registration accept message may include information indicating that the UE 510 is successfully registered at the private network 1010. For example, the registration accept message may include information expressed as 'registration result="registered to private network only"'.

Figure 11:
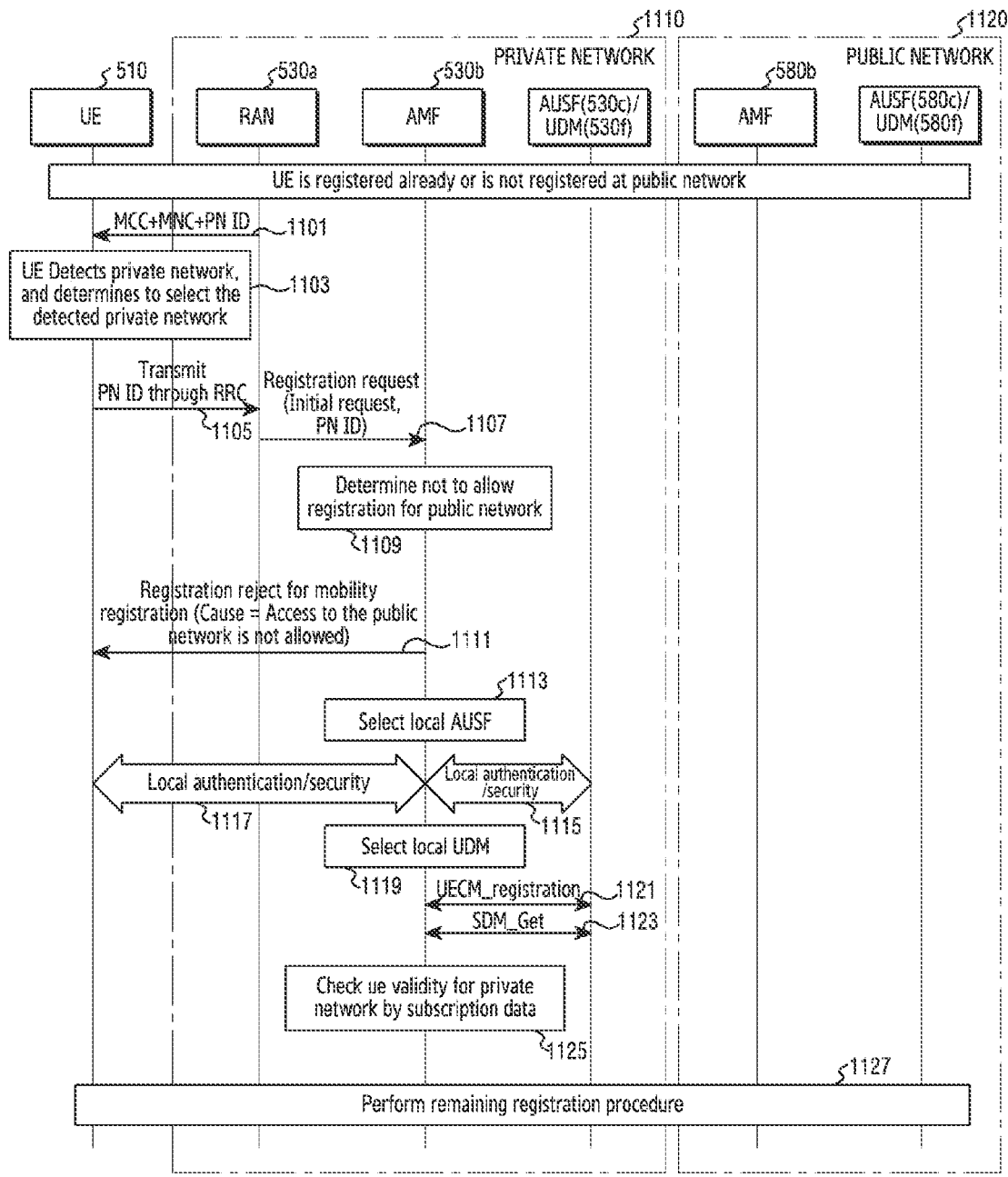
FIG. 11 illustrates a signal flow for a terminal to register at a type B private network in a wireless communication system according to various embodiments of the present disclosure.

FIG. 11 illustrates a signal flow for a UE to register at a type B private network in a wireless communication system according to various embodiments of the present disclosure. In FIG. 11, it is assumed that the UE 510 is connected and/or registered to a public network 1120 and serviced by the public network 1120, or is not connected to the public network 1120, and a private network 1110 may include the type B private network.

Referring to FIG. 11, in step 1101, a base station (included in the RAN 560a) of the private network 1110 transmits the MCC, the MNC, and the PN ID to the UE 510. For example, the base station may broadcast identification information (i.e., the MCC, the MNC and the PN ID) of the private network 1110 serviced by the base station through an SIB message, and the UE 510 may identify the MCC, the MNC and the PN ID included in the SIB message.

In operation 1103, the UE 510 may detect the private network 1110, and determine to select the detected private network 1110. The UE 510 may discover the private network 810 to which the UE 510 is subscribed, identify that the private network 1110 is the type B private network based on at least one of the identification information (i.e., the MCC, the MNC, and the PN ID) of the private network 1110, and determine to select the private network 1110.

In step 1105, the UE 510 transmits a registration request message to the base station. In other words, the UE selecting the private network 1110 may perform a registration procedure to access the private network 1110. For example, the UE 510 and the base station may perform the RRC connection establishment, and the UE 510 may transmit the registration request message to the base station through the RRC. The UE 510 may set the registration type to the initial registration in the registration request message, and the registration request message may include at least one of the identification information of the private network 1110 and the ID of the UE 510 to indicate the registration for the private network 1110. For example, the identification information of the private network 1110 may be expressed with a combination of the MCC, the MNC, and the PN ID. As another example, the registration request message may include a private network access indicator indicating that the UE 510 attempts to access the private network 1110 instead of the identification information of the private network 1110. The ID of the UE 510 may include a private network UE ID which is a subscriber ID assigned for a subscriber of the private network 1110. In various embodiments, instead of the private network UE ID, an unencrypted SUPI may be used as the ID of the UE 510, as the SUPI which is the subscriber ID assigned in the public network to which the UE 510 is subscribed. In addition, an encrypted SUPI may be used as the ID of the UE 510, as the SUPI which is the subscriber ID assigned in the public network to which the UE 510 is subscribed according to an encryption rule shared between the UE 510 and the private network 1110.

In step 1107, the base station forwards the registration request message to the AMF 560b. The base station may identify the identification information of the private network 1110 from the registration request message received from the UE 510, and forward to the AMF 560b included in the CN of the private network 1110 corresponding to the identification information. The base station may forward the registration request message to the AMF 560b through an N2 message, and the forwarded message may include at least one of information indicating that the registration type is the initial registration, the identification information of the private network 1110, and the ID of the UE 510.

In step 1109, the AMF 560b determines not to allow the registration for the public network 1120. The AMF 560b may determine whether to manage the access of the UE 510 in the public network 1120 as well as in the private network 1110. The AMF 560b may identify that the private network 1110 to which the UE 510 tries to access is the type B private network, wherein the AMF 560b may determine that the registration of the UE 510 for the private network 1110 is required, and not to allow the registration for the public network 1120.

In step 1111, the AMF 560b forwards a registration reject message for the mobility registration to the UE 510. For example, if the UE 510 attempts the mobility registration, the AMF 560b may transmit to the UE 510 the registration reject message including information expressed as 'cause="access to the public network is not allowed"'. After the UE 510 receives the registration reject message, the UE 510 may be triggered to attempt the initial registration for the private network 1110.

The AMF 530b performs the authentication for the private network 1110 of the UE 510, and perform the authorization procedure for checking the validity for using the private network 1110 of the UE 510 by acquiring subscription information for using the private network 1110 of the UE through the UDM 530*f* of the private network 1110. Operations of the AMF 530*b* for doing so may be performed through steps described below.

In step 1113, the AMF 560*b* selects a local AUSF. In various embodiments, the local AUSF may be an AUSF (e.g., the AUSF 560*c*) of the private network 1110. If the AMF 560*b* performs the authentication for the UE 510 in the private network 1110, the AMF 560*b* may select the AUSF 560*c*. For example, if the AMF 560*b* performs separate authentication for using the private network 1110, the AMF 560*b* may select the AUSF which supports the authentication for a UE subscribed to the private network 1110 among AUSFs of the private network 1110.

In step 1115, the AMF 560*b* may perform the authentication procedure and/or the security procedure for the selected AUSF 560*c*. In step 1117, the AMF 560*b* may perform the authentication procedure and/or the security procedure for the UE 510. In various embodiments, step 1115 may be performed before, after, or together with step 1117.

In step 1119, the AMF 560*b* selects a local UDM (e.g., the UDM 560*f*). The AMF 560*b* may select the UDM 560*f* which manages the subscription information and/or the registration information of the UE in the private network 1110.

In step 1121, the AMF 560*b* performs a UECM registration procedure. In the UECM registration procedure, the AMF 560*b* may update the registration information of the UE 510 to the UDM 560*f*.

In step 1123, the AMF 560*b* performs an SDM acquisition procedure. In the SDM acquisition procedure, the AMF 560*b* may retrieve the subscription information of the private network 1110 for the UE 510 from the UDM 560*f*.

In step 1125, the AMF 560*b* checks the validity of the UE 510 in the private network 1110 by subscription data. In other words, the AMF 560*b* may check the validity of the UE 510 for the private network 1110 based on the subscription data obtained from the private network 1110. The AMF 560*b* obtaining the subscription information of the UE 510 for the private network 1110 from the UDM 560*f* may perform the authorization procedure for checking the validity for the use of the private network 1110 based on the subscription information.

In step 1127, the AMF 560*b* performs the remaining registration procedure. For example, the AMF 560*b* may perform the authorization and authentication procedures for registration of the UE 510, and then forward a registration accept message to the UE 510 according to results of the authorization and the authentication (if the authorization and the authentication are successful).

Figure 12:
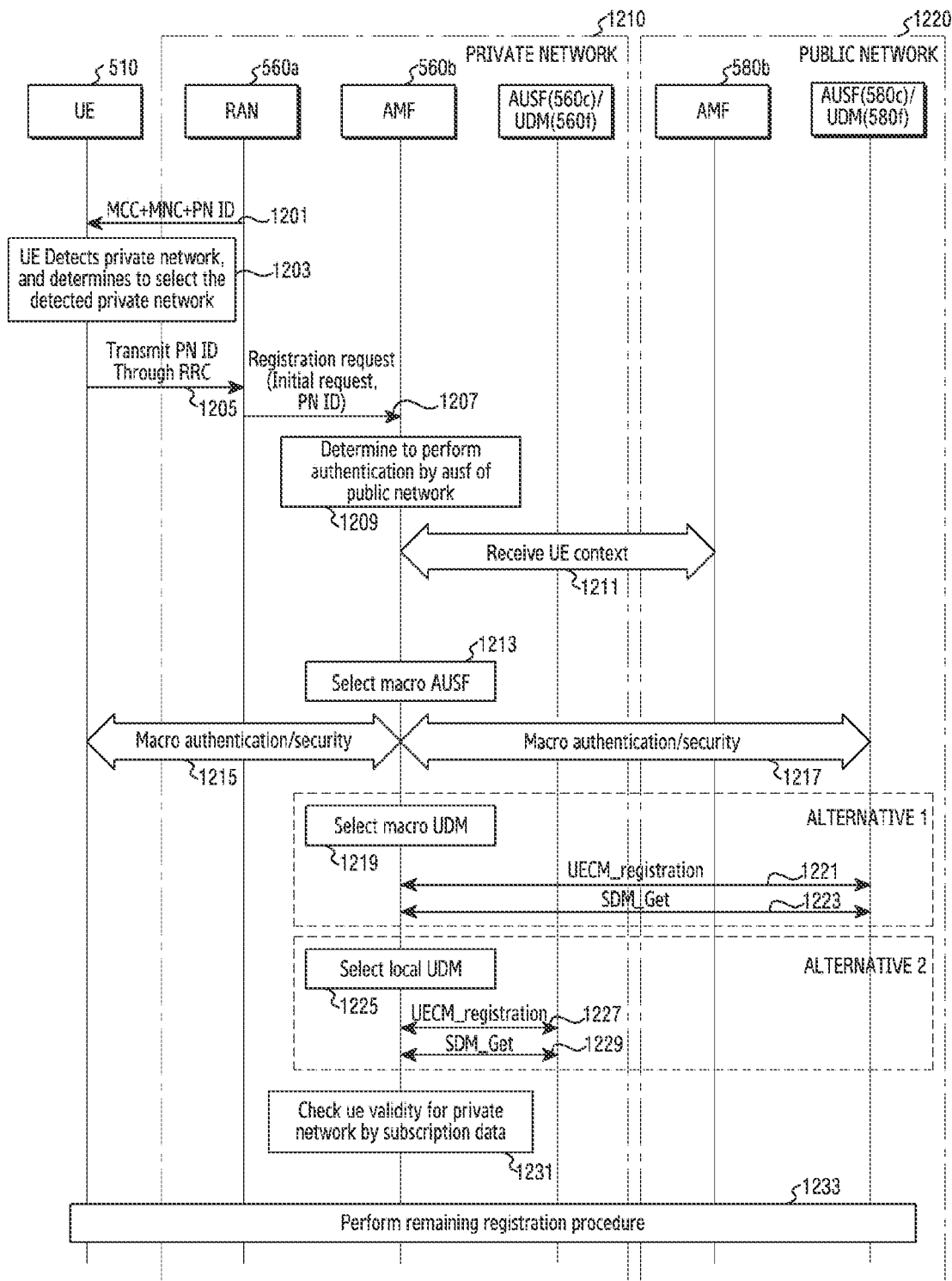
FIG. 12 illustrates a signal flow for a terminal to initially register at a type A private network in a wireless communication system according to various embodiments of the present disclosure.

FIG. 12 illustrates a signal flow for initial registration of a UE for a type A private network in a wireless communication system according to various embodiments of the present disclosure. In FIG. 12, a private network 1210 may include the type A private network.

Referring to FIG. 12, in step 1201, a base station (included in the RAN 560*a*) of the private network 1210 transmits the MCC, the MNC, and the PN ID to the UE 510. For example, the base station may broadcast identification information (i.e., the MCC, the MNC and the PN ID) of the private network 1210 serviced by the base station through an SIB message, and the UE 510 may identify the MCC, the MNC and the PN ID included in the SIB message.

In operation 1203, the UE 510 may detect the private network 1210, and determine to select the detected private network 1210. The UE 510 may discover the private network 810 to which the UE 510 is subscribed, identify that the private network 1210 is the type A private network managed by the operator of a public network 1220 to which the UE 510 is subscribed based on at least one of the identification information (i.e., the MCC, the MNC, and the PN ID) of the private network 1210, and determine to select the private network 1210.

In step 1205, the UE 510 transmits a registration request message to the base station. In other words, the UE selecting the private network 1210 may perform a registration procedure to access the private network 1210. For example, the UE 510 and the base station may perform the RRC connection establishment, and the UE 510 may transmit the registration request message to the base station through the RRC. The UE 510 may set the registration type to the initial registration in the registration request message, and the registration request message may include at least one of the identification information of the private network 1210 and the ID of the UE 510 to indicate the registration for the private network 1210. For example, the identification information of the private network 1210 may be expressed with a combination of the MCC, the MNC, and the PN ID. As another example, the registration request message may include a private network access indicator indicating that the UE 510 attempts to access the private network 1210 instead of the identification information of the private network 1210. The ID of the UE 510 may be, for example, a temporary ID (e.g., a GUTI) assigned by the public network 1220, or a subscriber ID (e.g., a SUTI) assigned by the public network 1220. In various embodiments, the registration request message may further include a private network UE ID which is a subscriber ID assigned for a subscriber of the private network 1210.

In step 1207, the base station forwards the registration request message to the AMF 560*b*. The base station may identify the identification information of the private network 1210 from the registration request message received from the UE 510, and forward to the AMF 560*b* included in the CN of the private network 1210 corresponding to the identification information. The base station may forward the registration request message to the AMF 560*b* through an N2 message, and the forwarded message may include at least one of information indicating that the registration type is the initial registration, the identification information of the private network 1210, and the ID of the UE 510.

In step 1209, the AMF 560*b* determines to perform the authentication by the AUSF 580*c* of the public network 1220. In other words, the AMF 560*b* receiving the registration request message determines whether to perform the authentication for the UE 510 through the AUSF 580*c* and/or the UDM 580*f* of the public network 1220. For example, if the AMF 560*b* identifies based on the ID of the UE 510 and/or the identification information of the private network 1210 included in the registration request message from the UE 510 that the private network 1210 to which the UE 510 attempts to access is managed through the public network 1220 which assigns the SUPI of the UE 510, or if the roaming is agreed between the public network 1220 which assigns the SUPI of the UE 510 and the public network which manages the private network 1210, the AMF 560*b* determines to authenticate the UE 510 through the AUSF 580*c* and/or the UDM 580*f* of the public network 1220.

In step 1211, the AMF 560*b* receives UE context. The AMF 560*b* may retrieve UE context information pre-registered in the public network 1220 from the AMF 580*b* of the public network 1220 using the ID (e.g., the GUTI and/or the SUTI) of the UE 510 included in the registration request message.

In various embodiments, if the AMF 560b determines to authenticate the UE 510 through the AUSF 580c and/or the UDM 580f of the public network 1220 during the registration procedure, the AMF 560b selects the AUSF 580c and/or the UDM 580f of the public network, and authenticates the private network 1210 of the UE 510 through the selected AUSF 580c and/or UDM 580f.

That is, the AMF 560b determining to authenticate the UE 510 through the AUSF 580c and/or the UDM 560f of the public network in step 1209, selects a macro AUSF in step 1213. In various embodiments, the macro AUSF may be an AUSF (e.g., the AUSF 580c) of the public network 1220. For example, if the authentication for using the private network 1210 is required, the AMF 560b may select the AUSF which supports the authentication for a UE subscribed to the private network 810 among AUSFs of the public network 1220, using identification information of the private network 1210. The identification information of the private network 1210 may be expressed with at least one of the MCC, the MNC and the PN ID, or a combination of at least two of the MCC, the MNC and the PN ID. Alternatively, the AMF 560b may use the identification information (i.e., at least one of the MCC and the MNC) of the public network 1220, to search for an AUSF suitable for the public network 1220 such as the UE 510.

In step 1215, the AMF 560b may perform the authentication procedure and/or the security procedure on the UE 510. In step 1217, the AMF 560b may perform the authentication procedure and/or the security procedure for the macro AUSF 580c. In various embodiments, step 815 may be performed before, after, or together with step 817. Depending on the policy of the private network 1210, step 1215 and/or step 1217 may be omitted.

In various embodiments, whether the subscription information for using the private network 1210 is managed in the UDM 580f of the public network 1220 (the first alternative), or in the UDM 560f of the private network 1210 (the second alternative) may be determined according to the operator policy of the public network 1220 which manages the private network 1210. Thus, if the AMF 560 searches for the UDM for the authentication, the AMF 560b may refer to the identification information of the private network 1210. In other words, the AMF 560b may search for the UDM for the authentication, based on the identification information of the private network 1210 (i.e., at least one of the MCC, the MNC, the PN IO, or a combination of at least two of them).

As in the first alternative, if the subscription information for using the private network 1210 is managed in the UDM 580f of the public network 1220, the AMF 560b selects the macro UDM, in step 1219. In various embodiments, the macro UDM may be a UDM (e.g., the UDM 580f) of the public network 1220. Based on the identification information of the private network 1210, the AMF 560b may search for and select the UDM 580f which manages the subscription information for the private network 1210.

In step 1221, the AMF 560b performs a UECM registration procedure. If the subscription information for using the private network 1210 is managed by the UDM 580f of the public network 1220, in the UECM registration procedure, the AMF 560b may update the registration information of the UE 510 to the UDM 580f of the public network 1220.

In step 1223, the AMF 560b performs an SDM acquisition procedure. In the SDM acquisition procedure, the AMF 560b may obtain the subscription information of the UE 510 for the private network 1210 from the UDM 580f of the public network 1220.

As in the second alternative, if the subscription information for using the private network 1210 is managed in the UDM 560f of the private network 1210, the AMF 560b selects a local UDM, in step 1225. In various embodiments, the local UDM may be a UDM (e.g., the UDM 560f) of the private network 810. The AMF 560b may search for and select the UDM 560f which manages the subscription information for the private network 1210, based on the identification information of the private network 1210.

In step 1227, the AMF 560b performs a UECM registration procedure. If the subscription information for using the private network 1210 is managed by the UDM 560f of the private network 1210, in the UECM registration procedure, the AMF 560b may update the registration information of the UE 510 to the UDM 560f of the private network 1210.

In step 1229, the AMF 560b performs an SDM acquisition procedure. In the SDM acquisition procedure, the AMF 560b may obtain the subscription information of the UE 510 for the private network 1210 from the UDM 560f of the private network 1220.

In step 1231, the AMF 560b performs the UE validity check for the private network 1210 by subscription data. By obtaining the subscription information for using the private network 1210 from the UDM 580f of the public network 1220 (the first alternative), or from the UDM 560f of the private network 1210 (the second alternative), the AMF 560b may perform the authorization procedure for checking the validity for the use of the UE 510 for the private network 1210.

In step 1233, the AMF 560b performs the remaining registration procedure. For example, the AMF 560b may perform the authorization and authentication procedures for registration of the UE 510, and then forward a registration accept message to the UE 510 according to results of the authorization and the authentication (if the authorization and the authentication are successful). The registration accept message may include information indicating that the UE 510 is successfully registered to the private network 810, and information indicating the successful registration for the public network 820. For example, the registration accept message may include information expressed as 'registration result="registered to both public and private network"'.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Thus, the scope of the present disclosure is not limited and defined by the described embodiment and is defined not only the scope of the claims as below but also their equivalents.

The invention claimed is:

1. A method performed by a core network entity in a wireless communication system, comprising:
   obtaining identification information of a private network from a registration request message obtained from a user equipment;
   selecting an authentication server function (AUSF) which supports authentication for the UE, based on the identification information of the private network;
   in response to performing an authentication procedure for the AUSF and the UE, selecting unified data management (UDM) for managing subscription information and registration information of the UE;
   obtaining the subscription information of the UE for the private network from the UDM;
   performing validity check of the UE for the private network, based on the subscription information of the UE; and
   registering the UE at the private network, based on results of the authentication procedure and the validity check.

2. The method of claim 1, wherein the private network comprises a type A private network associated with a public network.

3. The method of claim 2, wherein the AUSF and the UDM are included in the public network, further comprising:
   selecting a local UDM included in the private network; and
   obtaining the subscription information of the UE for the private network from the local UDM, and
   performing the validity check of the UE for the private network comprises:
   performing the validity check of the UE for the private network based on subscription information of the UE obtained from the UDM, and subscription information of the UE obtained from the local UDM.

4. The method of claim 2, wherein the AUSF and the UDM are included in the private network, further comprising:
   selecting a macro UDM included in the public network; and
   obtaining the subscription information of the UE for the private network from the macro UDM, and
   performing the validity check of the UE for the private network comprises:
   performing the validity check of the UE for the private network, based on subscription information of the UE obtained from the UDM, and subscription information of the UE obtained from the local UDM.

5. The method of claim 2, wherein the registration request message is transmitted within a preset time after access of the UE to the public network is completed.

6. The method of claim 2, further comprising:
   determining not to allow the registration of the UE for the public network based on at least one of an identifier (ID) of the UE and identification information of the private network included in the registration request message; and
   forwarding a registration reject message for mobility registration of the UE to the UE, to trigger initial registration of the UE for the private network.

7. The method of claim 2, further comprising:
   determining not to allow the registration of the UE for the public network;
   requesting for an ID of the UE for the private network to the UE; and
   obtaining the ID of the UE from the UE.

8. The method of claim 1, wherein the private network comprises a type B private network which is not associated with a public network, further comprising:
   identifying the type B private network, based on the identification information of the private network included in the registration message;
   in response to identifying, determining not to allow the registration of the UE for the public network; and
   forwarding a registration reject message for mobility registration of the UE to the UE, to trigger initial registration of the UE for the private network.

9. An apparatus of a core network entity in a wireless communication system, comprising:
   a transceiver; and
   at least one processor operably coupled to the transceiver, and controlling the transceiver,
   wherein the at least one processor is configured to,
   obtain identification information of a private network from a registration request message obtained from a user equipment,
   select an authentication server function (AUSF) which supports authentication for the UE, based on the identification information of the private network,
   in response to performing an authentication procedure for the AUSF and the UE, select unified data management (UDM) for managing subscription information and registration information of the UE,
   obtain subscription information of the UE for the private network from the UDM,
   perform validity check of the UE with respect to the private network, based on the subscription information of the UE, and
   register the UE to the private network, based on results of the authentication procedure and the validity check.

10. The apparatus of claim 9, wherein the private network comprises a type A private network associated with a public network.

11. The apparatus of claim 10, wherein the AUSF and the UDM are included in the public network, and the at least one processor is configured to:
select a local UDM included in the private network;
obtain the subscription information of the UE for the private network from the local UDM; and
perform the validity check of the UE for the private network based on subscription information of the UE obtained from the UDM, and the subscription information of the UE obtained from the local UDM.

12. The apparatus of claim 10, wherein the AUSF and the UDM are included in the private network, and
the at least one processor is configured to:
select a macro UDM included in the public network;
obtain subscription information of the UE for the private network from the macro UDM; and
perform the validity check of the UE for the private network, based on subscription information of the UE obtained from the UDM, and the subscription information of the UE obtained from the local UDM.

13. The apparatus of claim 10, wherein the at least one processor is configured to:
determine not to allow the registration of the UE for the public network based on at least one of an identifier (ID) of the UE included in the registration request message and identification information of the private network; and
forward a registration reject message for mobility registration of the UE to the UE, to trigger initial registration of the UE for the private network.

14. The apparatus of claim 10, wherein the at least one processor is configured to:
determine not to allow the registration of the UE for the public network;
request an ID of the UE for the private network to the UE; and
obtain the ID of the UE from the UE.

15. The apparatus of claim 9, wherein the private network comprises a type B private network which is not associated with a public network, and
the at least one processor is configured to:
identify the type B private network, based on the identification information of the private network included in the registration message,
in response to identifying, determine not to allow the registration of the UE for the public network, and
forward a registration reject message for mobility registration of the UE to the UE, to trigger initial registration of the UE for the private network.

16. The apparatus of claim 9, wherein the registration request message is transmitted within a preset time after access of the UE to the public network is completed.

* * * * *